INVENTORS
JAMES W. EDWARDS
SHELLY W. MAYS
RODNEY W. STOUT
BY
*Robert J. Schaap*
ATTORNEY

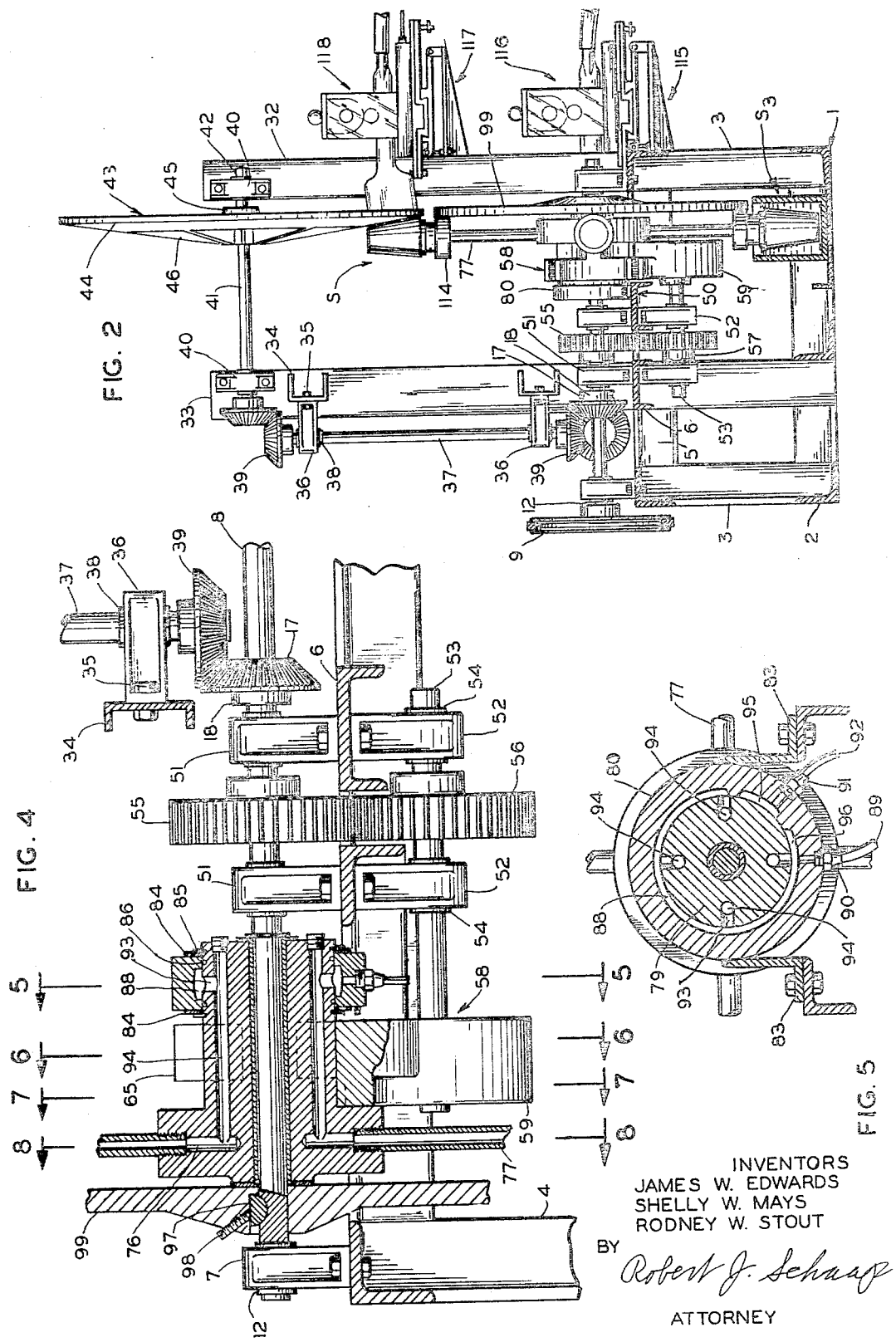

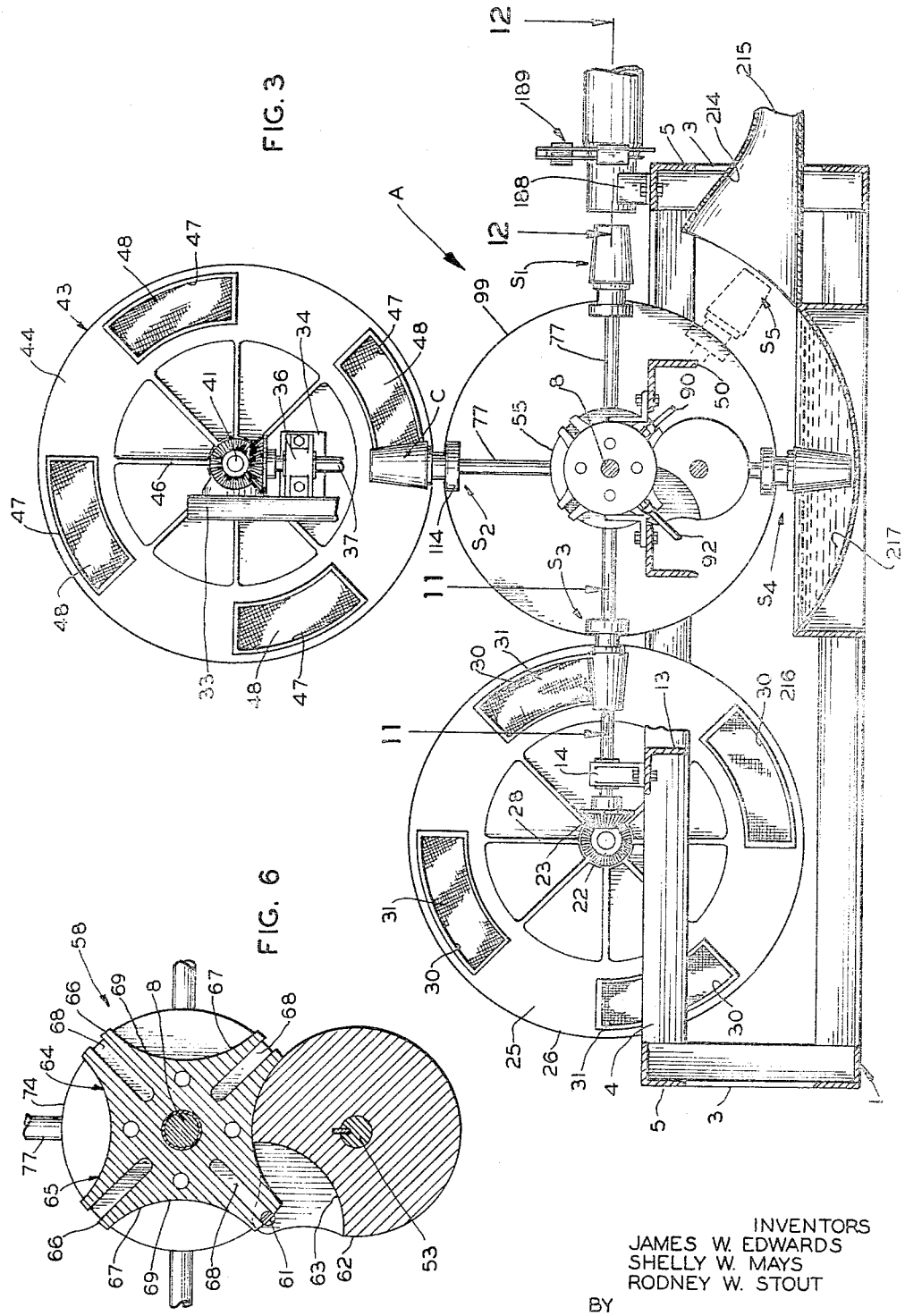

INVENTORS
JAMES W. EDWARDS
SHELLY W. MAYS
RODNEY W. STOUT
BY
*Robert J. Schaap*
ATTORNEY Feb. 7, 1967 J. W. EDWARDS ET AL 3,302,580
ELECTROSTATIC PRINTING WITH ROTATING SCREEN
FRAME AND PLURAL PRINT STATIONS
Filed Aug. 25, 1965 7 Sheets-Sheet 5

INVENTORS
JAMES W. EDWARDS
SHELLY W. MAYS
RODNEY W. STOUT
BY
*Robert J. Schaap*
ATTORNEY

INVENTORS
JAMES W. EDWARDS
SHELLY W. MAYS
RODNEY W. STOUT

BY

*Robert J. Schaap*

ATTORNEY

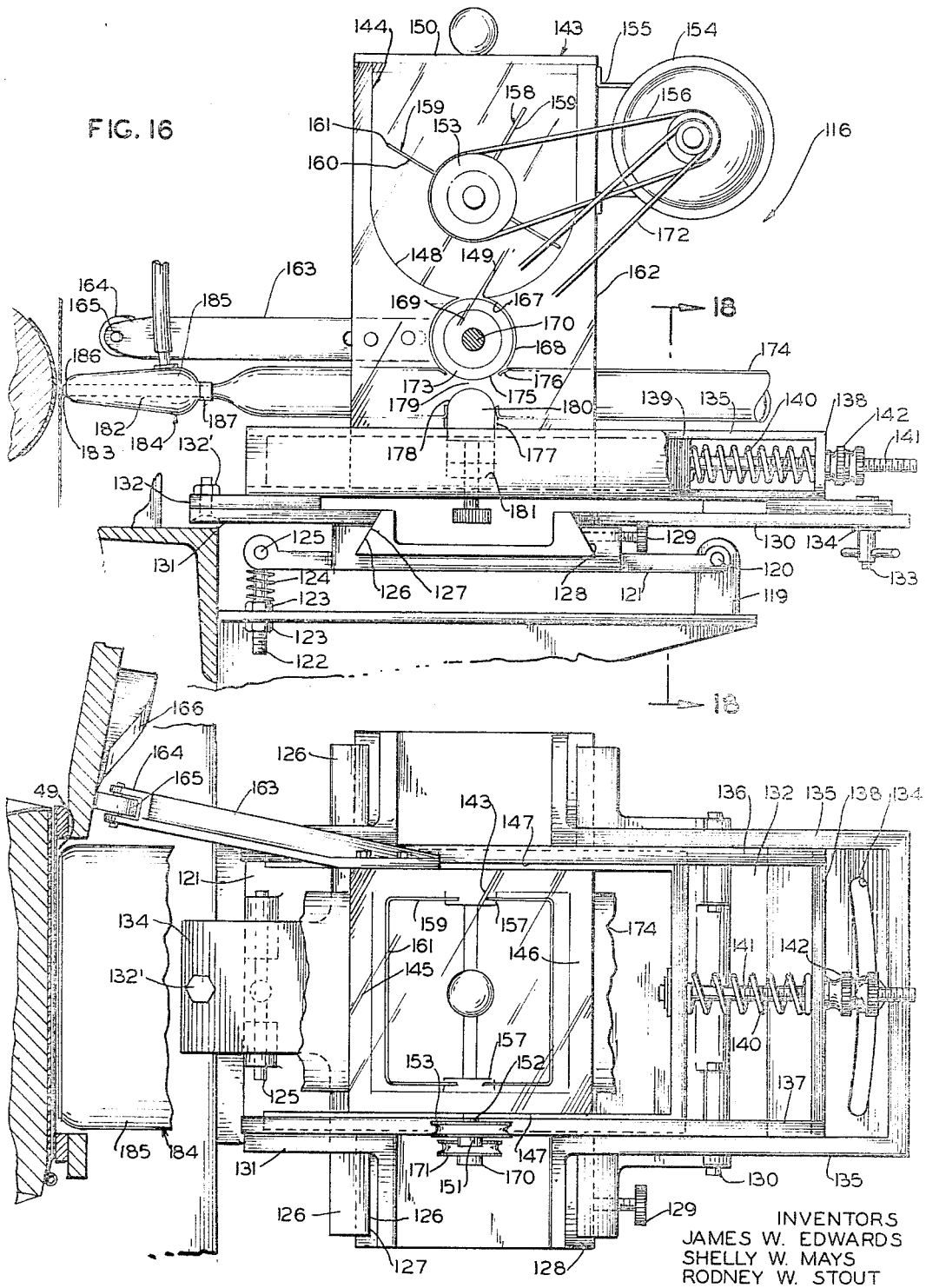

United States Patent Office 3,302,580
Patented Feb. 7, 1967

3,302,580
ELECTROSTATIC PRINTING WITH ROTATING SCREEN FRAME AND PLURAL PRINT STATIONS
James W. Edwards, Creve Coeur, Shelly W. Mays, St. Louis, and Rodney W. Stout, Webster Groves, Mo., assignors to Monsanto Company, St. Louis, Mo., a corporation of Delaware
Filed Aug. 25, 1965, Ser. No. 482,475
24 Claims. (Cl. 101—39)

This invention relates in general to certain new and useful improvements in electrostatic printing, and more particularly, to an improved automatically operable printing apparatus for electrostatic printing on a mass-production basis.

Since the advent of the thin-walled disposable containers made of plastic and synthetic resinous materials, these containers have found widespread use in the packaging industry. The vending machine industry particularly has been employing large quantities of nestable plastic containers in addition to the long-used conventional nestable paperboard containers. It is generally necessary, in this type of industry, to imprint the contents of the container, the name of the manufacturer, and/or distributor, and any other advertising and identification material on the sidewall of the container. The conventional printing methods employing offset printing techniques were not generally acceptable, because they were not adapted to mass-production operation and did not produce a desired quality of print. Because of the low profit margin on disposable containers, profits in this type of field are generally made on a volume sale basis. Accordingly, it is necessary to print containers of this type in an economically feasible manner and the containers must be printed automatically by suitable apparatus.

In an effort to find a suitable method of imprinting containers having frustro-conical shapes, there have been certain investigations in the field of electrostatic printing. However, the art of electrostatic printing is relatively new and this particular type of printing was only available for printing on flat or relatively flat items. To date, electrostatic printing techniques have not been adaptable for use in printing relatively larger areas on non-planar surfaces.

The presently known techniques in electrostatic printing are described in United States Letters Patent No. 3,081,-698 which relates to a method of electrostatic printing by elimination of pressure or contact between the printing element and the subject material being printed. This technique involves the transfer of a resinous based ink through an electrostatic field to an image-receiving medium. The ink or pigments are usually in the form of a fine powder having a particle size which is small enough to pass through the interstices of the open areas of a stencil or so-called "screen." A roller or similar mechanical device normally carries the ink particles to a point in close proximity to the stencil and where the ink is carried through the stencil by the electrostatic field to the image-receiving object. During this transfer, the particles are triboelectrically charged and are thus attracted toward the image-receiving object by a dielectric potential applied to the object or to a backing electrode. The charge of the particles is, of course, opposite to the backing plate and they are, therefore, accelerated through the openings or interstices in the open areas of the screen. Moreover, they are propelled toward the image-receiving object. The image-receiving object normally consists of a mandrel which is capable of retaining the article to be printed. Thereafter, the pigment will collide with and adhere to the article which is to be printed and the image is subsequently fixed by heat or solvent or a vapor or by other suitable means which are known in the prior art.

Since the initial development of the theory of electrostatic printing, there have been many attempts to produce devices which are capable of automatic printing. Moreover, there have been attempts to print non-linearly shaped articles by electrostatic methods. However, all of the attempts to produce these automatic and semi-automatic devices for electrostatic printing have been rather unsuccessful and commercially unfeasible for a number of reasons. All of the electrostatic printing devices thus far employed have involved the transfer of ink across a definite and appreciable space and the particles of ink had to be physically transported across this space. However, surface tension effects on the delivery roller often prevented an even and uniform distribution of ink flow. Accordingly, the devices of the prior art had to be constructed in such manner that the field across which the particles moved had an extremely large potential difference. Moreover, the various electrodes had to be specially designed in order to prevent uneven distribution and flow of ink particles.

Moreover, the devices of the prior art were not designed with a wide range of utility, and accordingly, were not capable of printing with a wide variety of types, colors, and ink particle sizes. Relatively heavy electron space currents were used to assist in the movement of ink in order to attain even distribution with various sized particles of ink. However, the relatively high ionization level at the air gap for printing, often causes arcing which interferes with and materially reduces the overall efficiency of the electrostatic printing device. Furthermore, with the devices of the prior art, it was difficult to achieve a carefully controlled quantity of electricity for effecting optimum results of the transfer of ink to the article being printed. As a result thereof, the devices of the prior art were not suitably designed for mass-production printing operations.

The substitution of a plate electrode for flat items was not an expensive or time-consuming procedure when printing on relatively flat surfaces. However, there was no available technique or device which was capable of accepting a large number of mandrels or articles supporting spindles. It is not a particularly difficult function to change a mandrel, but the devices presently available are not designed to accommodate mandrels of a different size or shape. Inasmuch as electrostatic screen process printing involves accurate positioning of the electrodes within very close tolerance limits, the conventional printing apparatus of the prior art are not adaptable to electrostatic printing techniques.

It is, therefore, the primary object of the present invention to provide an electrostatic printing apparatus which is capable of electrostatically printing a large variety of articles having varying sizes and shapes.

It is another object of the present invention to provide an electrostatic printing apparatus and method of the type stated which is capable of achieving a high degree of printing precision on a mass-production basis.

It is a further object of the present invention to provide an electrostatic printing apparatus and method of the type stated which is characterized by simplicity, dependability, ruggedness and low cost.

It is also an object of the present invention to provide an electrostatic printing apparatus of the type stated which is capable of being altered for employment in a multi-color printing system.

It is an additional object of the present invention to provide an electrostatic printing apparatus of the type stated which is particularly adaptable to partial or complete circumferential printing on articles having curvilinear shapes.

It is another salient object of the present invention to provide an electrostatic printing apparatus and method of the type stated where tangential approach and tangential departure is maintained between an article being printed and the screen for printing to occur along an elemental line of closest approach, for each succeeding article on a mass-production basis.

With the above and other objects in view, our invention resides in the novel features of form, construction, arrangement and combination of parts presently described and pointed out.

In the accompanying drawings (7 sheets):

FIGURE 1 is a top plan view, partially broken away, of an electrostatic printing apparatus constructed in accordance with and embodying the present invention;

FIGURES 2, 3 and 4 are vertical sectional views taken along lines 2—2, 3—3 and 4—4 respectively of FIGURE 1;

FIGURES 5, 6, 7 and 8 are fragmentary sectional views taken along lines 5—5, 6—6, 7—7 and 8—8 respectively of FIGURE 4;

Figure 12:
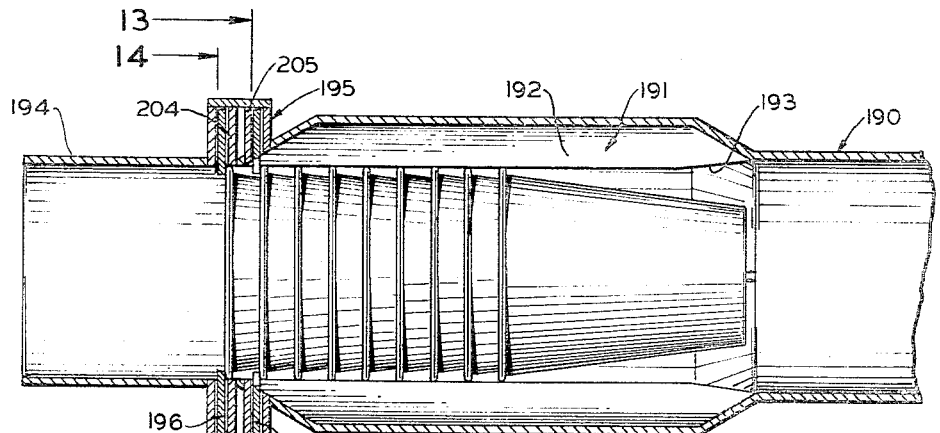
FIGURE 12 is a horizontal fragmentary sectional view taken along line 12—12 of FIGURE 3 and showing the details of construction of the cup dispensing apparatus forming part of the present invention.
Figure 13:
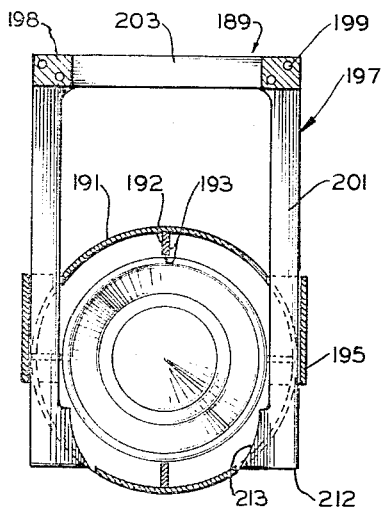
Figure 14:
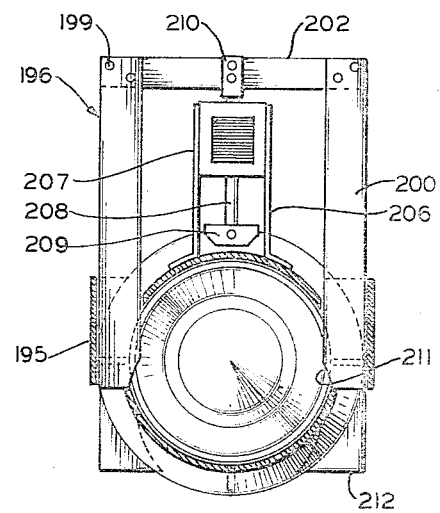
Figure 15:
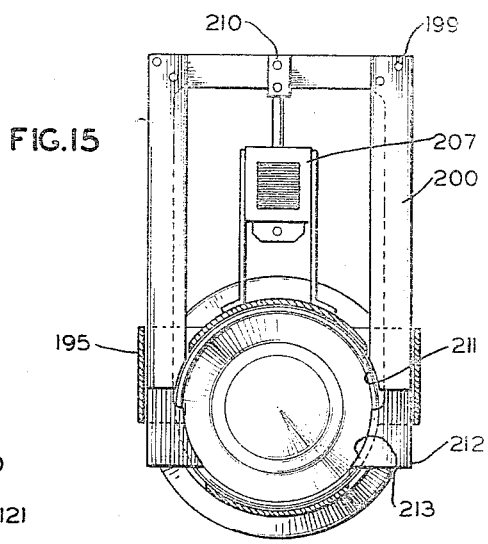
Figure 18:
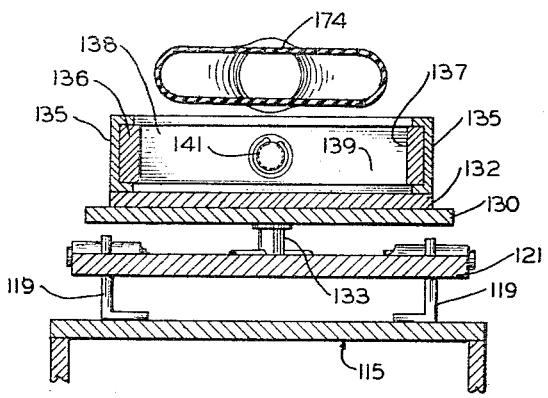

FIGURES 13 and 14 are fragmentary sectional views taken along lines 13—13 and 14—14, respectively, respectively of FIGURE 12;

FIGURE 15 is a fragmentary sectional view of the cup dispensing apparatus similar to the sectional view of FIGURE 14 and showing the actuating arm in its lowered position;

FIGURE 16 is a front elevational view, partially broken away and in section, of an ink feeding mechanism forming part of the present electrostatic printing apparatus;

FIGURE 17 is a top plan view, partially broken away and in section, of the ink feeding mechanism illustrated in FIGURE 16; and FIGURE 18 is a fragmentary sectional view taken along line 18—18 of FIGURE 16.

The art of electrostatic printing is still a recent technological innovation, and the terminology peculiar to this technology has not achieved a commonly acceptable and understood usage and definition. Accordingly, the term "printing" as used herein, is employed to describe the operation of a delivery of ink from the inking member to the element being printed, although it is to be understood that the word "printing" as used herein does not connote any mechanical pressure. The word "printing" is used in its much broader sense of the word merely to mean transfer of a design from one element to another in analogous form to the use of the term "printing" in photography where mechanical pressure is not the cause of tanrsference of the design. In interpretation of the specification and the following claims, all terminology borrowed from the conventional printing art must, therefore, be given a broad meaning appropriate to this specialized field of electrostatic printing.

General description

Generally speaking the present invention relates to an apparatus which is automatic in its operation, and method for electrostatic printing of conically shaped articles. The apparatus is designed to imprint desired information on the side walls of generally frusto-conically shaped containers of the nestable disposable type. However, the apparatus of the present invention is, of course, adaptable to electrostatic printing of many types and sizes of articles capable of receiving electroscopic ink. The apparatus generally comprises a base with a supporting frame constructed of standard roll-shaped channels. Operatively mounted on the supporting frame is a suitable electric motor for operating a pair of rotating screen support frames and an intermittently rotatable turret. Each of the screen supporting frames is continuously rotatable and each is provided with four radially spaced electrostatic printing screens. Each of the electrostatic printing screens is preferably provided with the same image so that ecah of the substrates to be printed will have the same image or pattern. Each of the rotatable screen support frames is so located that it does not interfere with the operation of each other, and moreover, each is driven by a complex gearing and drive shaft system.

The electric motor also operates a main drive shaft which, in turn, drives a primary Geneva shaft through a pair of meshing pinion gears. A primary Geneva mechanism is operable by the primary Geneva shaft and generally comprises a pin-wheel. A secondary Geneva mechanism is operatively mounted on the main drive shaft in operative relation to the primary Geneva mechanism. The secondary Geneva mechanism, however, in effect forms a quill on the main drive shaft which also serves as a secondary Geneva shaft.

The secondary Geneva mechanism generally comprises a slot-wheel which is provided with four radially spaced elongated slots. Each of the slots is engageable by the pin of the pin-wheel forming part of the primary Geneva mechanism. A turret supporting four radially extending mandrel shafts is rigidly connected to the slot-wheel of the secondary Geneva mechanism and is, in turn, rotated as the slot-wheel is rotated.

In its operation, the pin-wheel of the primary Geneva mechanism rotates approximately 270° during which time the turret is not moved. During the last 90° of rotation of the pin-wheel which will constitute one complete revolution thereof, the actuator pin of the pin-wheel will engage a slot in the slot-wheel and rotate the slot-wheel through a 90° turn. Rotation of this wheel will also rotate the turret through a 90° turn. Each of the mandrel shafts is hollow and is provided with cup supporting mandrels on its outer ends. Accordingly, as the turret rotates 90°, each of the mandrels on the outer ends of the mandrel shafts will rotate through a 90° arc with the turret.

A valve drum is also secured to the slot-wheel and is rotatable therewith. The valve drum is concentrically disposed within a valve manifold, the latter being rigidly secured to the supportnig frame. The valve manifold is provided with a primary air passage or so-called vacuum passage which extends approximately through a 330° arc. The primary air passage is designed to maintain a vacuum on the valve drum in a manner hereinafter described. A secondary air passage extends for approximately 20° and is equidistantly disposed between the opposite ends of the 330° vacuum or primary air passage. The valve drum is provided with four sets of radial and communicating axial ducts, each of which, in turn, communicates with each of the four mandrels. Thus, when one of the radial ducts is in communication with the secondary air passage, air will be supplied to the mandrel causing a container disposed on the mandrel to be ejected therefrom. When the radial duct associated with the mandrel is in communication with the primary air or vacuum passage, a vacuum is maintained on the mandrel, thereby holding the container onto the mandrel.

A friction wheel is also operatively mounted on the main drive shraft and is continually rotatable therewith. The friction wheel is designed to mesh and operate friction gears mounted on each of the mandrel shafts for rotating the mandrels with respect to the cup turret as the turret rotates. While the drive mechanism described herein is referred to as a Geneva mechanism including primary and secondary Geneva mechanisms, it is to be understood that the components described herein do not comprise a true Geneva mechanism. The components described herein have been uniquely designed for purposes of this electrostatic printing apparatus. However, the terminology of the conventional Geneva mechanism has been employed as the unique drive disclosed herein operates on a principle similar to the operation of the conventional Geneva mechanism.

A suitable cup dispensing mechanism is disposed in proximate relationship to the mandrels for selectively dispensing a single cup which is deposited on the mandrel as the mandrel passes the cup dispensing mechanism. The placing of a container or cup on the mandrel constitutes a first work station or so-called "loading station." Thereafter, the turret is rotated through a 90° movement where the mandrel is shifted to a second work station or first printing station. In this station, the mandrel is positioned in relationship to the printing screen, where electrostatic printing on the container takes place. Thereafter, the turret is rotated through another 90° turn where the mandrel, with the cup supported thereon, is shifted to a third work station or second printing station. At the second printing station, electrostatic printing on a container can again take place. The image from the second printing station is generally marginally registered with the image of the first station and preferably with a different colored ink. Accordingly, multicolor printing can be employed on the present apparatus. Thereafter, the mandrel is rotated through another 90° turn where the container is introduced into a fixing tank permitting the image formed on the container to harden. During the last 90° quadrant, the container passes a discharge hopper maintained under vacuum, which constitutes a fifth work station or discharge station. The container is thereafter ejected from the mandrel and carried into a discharge tube. When the mandrel reaches the loading station again, a complete printing cycle has been performed. The mandrel and electrostatic printing screens are each rotated in pretimed relation. Moreover, the container is positioned in an axis of rotation so that the exterior wall of the container tangentially approaches and departs from the screen. Thus, printing will occur along an elemental line of closest approach between the container and the electrostatic printing screen. Moreover, the mandrel with the container supported thereon is rotated at approximately the same rate of speed or at the same peripheral speed as the movement of the screen so that a continuing line of tangency or tangential approach and departure occurs between the surface of the container supported on the mandrel and the surface of the screen. Actual tangential contact may not occur, however. The axis of rotation of the container may be axially translated slightly to prevent any tangential contact but still maintain tangential approach and departure. Accordingly, electroscopic ink is passed through the electrostatic printing screen along this line of tangency.

*Detailed description*

Referring now in more detail and by reference characters to the drawings which illustrate a preferred embodiment of the present invention, A designates an electrostatic printing apparatus which is formed by a pair of spaced longitudinally extending base channels 1, 2, provided at their corners with uprights 3. The uprights 3 are connected by a pair of upwardly spaced longitudinally extending support channels 4, and the base channels 2 and the upper channels 4 are connected by transverse channels 5. The channels 2, 4, 5 and the uprights 3 may be formed of any suitable standard rolled shape of channel, such as an I-beam shape or an H-beam shape or a standard U-beam shape, which is preferably formed of a relatively hard steel. Extending between each of the channels 4 is an intermediate support beam 6, substantially as shown in FIGURES 1 and 3.

Figure 1:
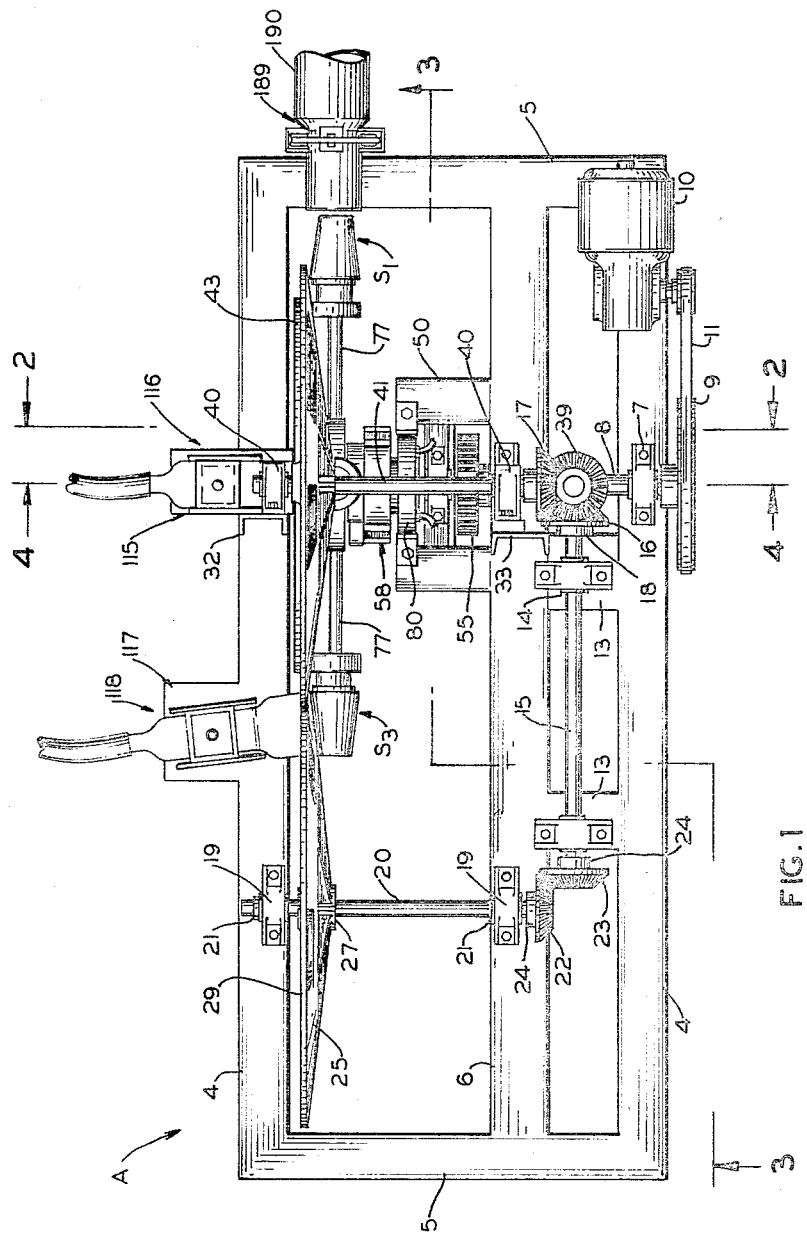

Bolted or otherwise rigidly secured to the forward and rearward channels 4 in the manner as shown in FIGURES 1 and 2 are a pair of spaced aligned pillow blocks 7 for journaling a transversely extending drive shaft 8. Rigidly mounted on the forward end of the drive shaft 8 is a pulley 9 which is connected to a suitable electric motor 10 by means of a drive belt 11. The electric motor 10 is rigidly mounted on the forwardly presented upward longitudinal channel 4 and is preferably of the explosion proof type. Moreover, the motor 10 may be reversible, and should be provided with a suitable speed reducing mechanism.

The drive shaft 8 is suitably retained within the pillow blocks 8 by means of washers and lock rings 12, which are preferably mounted on each side of the pillow blocks 7 in the manner as shown in FIGURES 1 and 2.

Extending between and welded to the forwardly spaced longitudinal channel 4 and the intermediate support beam 6 are a pair of longitudinally spaced L-shaped support bars 13 and bolted or otherwise rigidly secured thereto are upstanding longitudinally aligned pillow blocks 14. Extending between and journaled in the pillow blocks 14 is a longitudinally extending screen drive shaft 15, which is provided at its right end, reference being made to FIGURE 1, with a bevel gear 16 and which in turn is positioned in meshing engagement with a mating bevel gear 17, the latter being mounted on the transversely extending drive shaft 8. The bevel gears 16–17 are generally conventional and are provided with hubs 18 for mounting on the respective shafts 15, 8 respectively. Bolted or otherwise rigidly secured to the rearward longitudinal support channel 4 and to the intermediate support beam 6 are a pair of transversely aligned pillow blocks 19 for journaling a transversely extending screen supporting shaft 20. The shaft 20 is conventionally retained in transverse position by means of washers and lock rings 21 which bear against each side of each of the pillow blocks 19 in the manner as shown in FIGURE 1. At its forwardly presented transverse end, the shaft 20 is provided with a bevel gear 22 which is positioned in meshing engagement with a mating bevel gear 23 mounted on the left end of the screen drive shaft 15. The bevel gears 22, 23 are similarly retained on the respective shafts 20, 15 by means of hubs 24. The hubs may be keyed to or secured to the shafts by means of set screws (not shown).

Keyed or otherwise secured to the screen supporting shaft 20 is a circular screen support frame 25. The screen support frame 25 is provided with an annularly extending forwardly presented frustro-conical surface 26 for reasons which will presently more fully appear. The screen support frame 25 is also provided with a hub 27 for axial shifting along the screen support shaft 20 to the desired position. For this purpose, the hub as indicated above, may be provided with a key or removable set screw. Furthermore, for support, the screen may have a plurality of radially spaced and radially extending gussets 28. On its rearward surface, reference being made to FIGURE 1, the screen support frame 25 is provided with an annular recess 29 which matches the frustro-conical surface 26.

Bolted or otherwise rigidly secured to the forwardly presented face of the frustro-conical surface 26 are four radically spaced screen retaining frames 30 for removably retaining electrostatic printing screens 31. The screen retaining frames 30 are so designed that the electrostatic printing screens 31 may be easily removed and inserted therein when it is desired to change the printing design. Furthermore, by reference to FIGURE 3, it can be seen that the screen retaining frames are arcuately shaped and have an arcuate distance of approximately 45° with respect to the axial centerline of the screen support frame 25.

The electrostatic printing screen 31 is generally formed of a fine mesh conductive material or a material which is rendered conductive and wherein the non-printing areas are suitably masked. The non-masked portion or printing areas of the screen 31 are designed to permit pigments in the form of ink powders to pass through the interstices of the open areas. The screen 31 may be constructed by any of the presently known methods of making electrostatic printing screens. One particularly effective screen is provided where the mesh material is electroformed nickel with 250 wires to the inch. This screen element is then provided with a photosensitive coating so that it spans all of the interstices of the screen. The sensitized screen is then exposed to an arc which is preferably rich in ultraviolet light, through an interposed positive image of the desired copy. Exposure to the light is maintained for a time which is sufficient to harden the areas where the interposed image transmits light. The coated screen is then developed to dissolve the areas of the coating which were protected from the light by the opaque areas of the film image, thereby leaving a solid mask in the areas affected by the light.

Various methods of preparing the screen can be used. It is only necessary that the non-printing area be effectively masked to prevent the movement of pigment therethrough in subsequent electrostatic printing operations. This is accomplished very well by various known methods as well as the use of photosensitive coatings on the open mesh. Techniques familiar in the screen-silk process printing may also be employed in the production of stencils or screens for electrostatic printing operations. It is not necessary to have the regularity of openings of a fine mesh screen or sensitized net. The regular openings in fibrous materials and the like can be satisfactory as long as the openings in the particle size of the pigment are compatible for movement therethrough.

In many electrostatic printing operations which can be performed with the apparatus of the present invention, it has been found to be desirable to use a curved electrostatic printing screen. The screen 31 may also be manufactured or produced in the manner as described in my copending application Serial No. 463,251, filed June 11, 1965, and which relates to the method of producing curved electrostatic screens. In this method, a photosensitive emulsion is applied to a wire mesh support and held in screen chase. The screen is then exposed to light through a photographic negative of the required print or design to be ultimately imprinted upon a substrate. A washout of the exposed emulsion leaves a positive image on the screen which can be subsequently converted to a negative image required for printing by means of electroplating. The plating adheres preferentially to the open mesh portion of the screen. Subsequent treatment with an emulsion remover such as hydrogen peroxide and various acid etches will clear the print areas leaving a negative screen in which the non-print areas have interstices filled with metal. The plating metal is chosen to give a final screen which is rigid but formable by various forming methods such as rolling and drawing. The final screen thereafter can be shaped into a desired surface which will parallel complex surfaces to be printed.

The rearward support channel 4 and an intermediate support beam 6 are provided with transversely aligned U-shaped slots for accommodating vertically extending support columns 32, 33 respectively, and which are welded to the rearward support channel 4 and the intermediate support beam 6 in the manner as shown in FIGURES 1 and 2. Welded to one transverse side of the support column 33 and extending outwardly therefrom are a pair of vertically aligned bearing support brackets 34 and rigidly secured thereto by means of bolts 35 are a pair of vertically aligned pillow blocks 36. Journaled in and extending vertically through the pillow blocks 36 is a screen drive shaft 37 which is retained in the pillow blocks 36 by means of washers and locking rings 38 mounted on opposite sides of each of the pillow blocks 36 in the manner as shown in FIGURE 2. At its lower end, the screen drive shaft 37 is provided with a bevel gear 39 which is positioned in meshing engagement with the bevel gear 17 for driving the shaft 37. Similarly bolted to the side walls of the support columns 32, 33 are a pair of transversely aligned pillow blocks 40 for journaling a screen supporting shaft 41. The supporting shaft 41 is similarly retained in the pillow blocks 40 by means of washers and lock rings 42 mounted on each side of each of the pillow blocks 40.

Mounted on the screen supporting shaft 41 and being rotatable therewith is a screen support frame 43 which has a forwardly presented frustro-conical surface 44. The screen support frame 43 is provided with a hub 45 for mounting the screen support frame 43 on the shaft 41, by any conventional means such as a key or set screw so that the screen support frame 43 may be shifted on the shaft 41 to a desired position. On its rearward surface the screen support frame 43 is provided with a plurality of radially spaced gussets 46 which radiate outwardly from the hub 45 and provide sufficient internal strength against any strain supplied to the screen support frame 43. The screen support frame 43 is similarly provided with four radially spaced screen retaining frames 47 on its frustro-conical surface 44. Each of the four retaining frames 47 have an arcuate size of approximately 45° with respect to the axial centerline of the screen support frame 43 and each are designed so that an electrostatic printing screen 48 inserted therein may be easily removed and reinserted.

The electrostatic printing screen 48 is similar to the electrostatic printing screen 31 and both are generally constructed in the same manner and by the same process. However, it should be understood that the electrostatic printing screens 48 do not necessarily have to be provided with the same type of printed image or design as appears on the electrostatic printing screens 31. By further reference to FIGURES 1–3, it can be seen that the screen supporting frame 25 is driven through the shaft 20 and 15 by means of the bevel gears 16 and 17. The bevel gear 17 is driven through the shaft 8 which is, in turn, powered through the belt 11 by means of electric motor 10. Similarly, the screen support frame 43 is continuously rotated by means of rotational power from the shafts 37, 41. The screen support frame 43 is similarly provided with a recess 49 in the area of the frustro-conical surface 44 for reasons which will presently more fully appear.

Welded to and extending rearwardly from the intermediate support beam 6 in approximate alignment with the transversely extending drive shaft 8, is a manifold support frame 50. The frame is generally constructed of standard rolled steel L-shaped brackets. Mounted on the upper surface of the intermediate support beam 6 and of the manifold frame 50 are a pair of pillow blocks 51 which are aligned with the pillow blocks 7 and provide additional support for the drive shaft 8. Similarly mounted on the underside of the longitudinally extending supporting beam 6 and on the underside of the manifold support frame 50 immediately beneath the pillow blocks 51 are a pair of transversely spaced pillow blocks 52 for journaling a primary Geneva shaft 53. Again, the shaft 53 is retained in transversely aligned position by means of washers and lock rings 54 mounted on each side of each of the pillow blocks 52. Also mounted on the drive shaft 8 and being interposed between the pillow blocks 51 is a driving pinion gear 55 which meshes with a driven pinion gear 56 mounted on the primary Geneva shaft 53. The pinion gear 56 is similarly positioned between each of the pillow blocks 52 in the manner as shown in FIGURE 2. The pinion gears 55, 56 are conventionally provided with hubs 57 for mounting on the respective shafts 53. The hubs may be conventionally provided with keys or set screws for securing the gears 55, 56 to the respective shafts on which they are mounted.

Mounted on the rearward end of the primary Geneva drive shaft 53 is a primary Geneva mechanism 58, which generally comprises a pin-wheel or so-called "pin-gear" 59. The pin-wheel 59 is generally circular in cross-section and is provided with an outwardly extending lobe 60 and mounted on the lobe 60 is an axially extending actuator pin 61. By reference to FIGURE 10, it can be seen that the lobe 60 is somewhat triangularly shaped and extends beyond the line which would form the peripheral margin of a truly circular wheel. The pin-wheel 59 is also provided in the area of the lobe 60 with a quarter-round or arcuate recess 62 having an arcuate guide wall 63.

Figure 7:
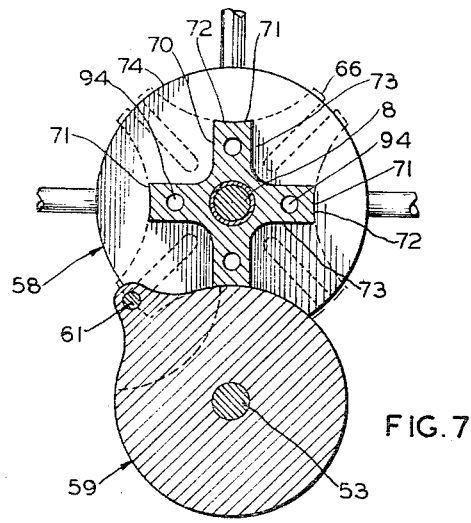

Rotatably mounted on the drive shaft 8 which also serves as a secondary Geneva shaft is a secondary Geneva mechanism 64. The secondary Geneva mechanism 64 generally comprises a slot-wheel or so-called "star-wheel" 65 which has four radially spaced crowns 66 connected by arcuately shaped webs 67. Thus, by reference to FIGURE 10, it can be seen that each of the crowns 66 is spaced at 90° intervals and is connected by the arcuately shaped webs 67. The radius of curvature of the arcuately shaped webs 67 is substantially equal to the radius of the pin-wheel 59, for reasons which will presently more fully appear. Each of the crowns 66 is provided with relatively deep pin engaging slots 68 and which are sized to accommodate the actuator pin 61. By reference to FIGURES 6 and 10, it can be seen that the webs 67 are provided with arcuately shaped concave guide surfaces 69. By reference to FIGURES 6, 7 and 9, it can be seen that the slots 68 are sufficiently deep so that the actuator pin 61 is extended therein to the full length of the guide slot 68 when the crowns 66 of the slot wheel 65 are engaged with the guide wall 63 of the pin-wheel 59. By further reference to FIGURES 6, 7 and 10, it can be seen that the concave guide surfaces 69 are formed with the same radius of curvature as the outer peripheral wall of the pin-wheel 59.

Rigidly secured to or integrally formred with the rearwardly presented flat surface of the slot-wheel 65 is a rearwardly extending web-wheel 70 having four radially spaced outwardly extending webs or arms 71, each of which is designed to carry pneumatic ducts in a manner hereinafter described in more detail. The web-wheel 70 is, in effect, angularly displaced 45° with respect to the slot-wheel 65 so that each of the four arms 71 is located midway between each of two slots 88. In this manner, a 45° angle exists between the centerline of one arm 71 and the centerline of one slot 68, whereas a 90° angle exists between the centerlines of each two slots 68, and a 90° angle exists between the centerline of each of two arms 71. This type of construction is more fully illustrated in FIGURE 6. Each of the arms 71 is provided with arcuately shaped concave peripheral surfaces 72 which match and are coplanar with the concave guide surfaces 69. It is important that the arms 71 do not extend beyond the concave guide surfaces 69 of the slot-wheel 65, for reasons which will be more fully apparent. Each of the arms 71 is separated by rectangularly shaped reliefs 73 and each of which is sized to accommodate the lobes 60. The slot-wheel 65 and the web-wheel 70 may be integrally formed by a cast-in-place mold, or the two elements may be cast separately or machined separately and thereafter welded to form a single unit. However, the method of constructing this mechanism does not in and of itself form part of the present invention and is, therefore, neither illustrated nor described in detail herein.

Figure 8:
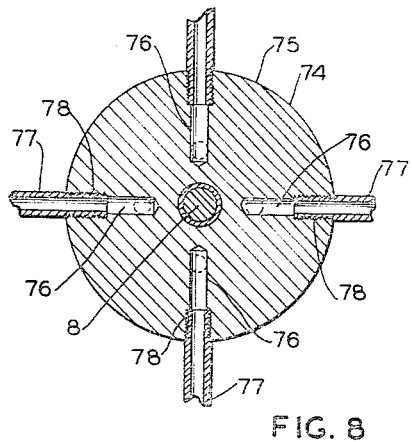
Figure 9:
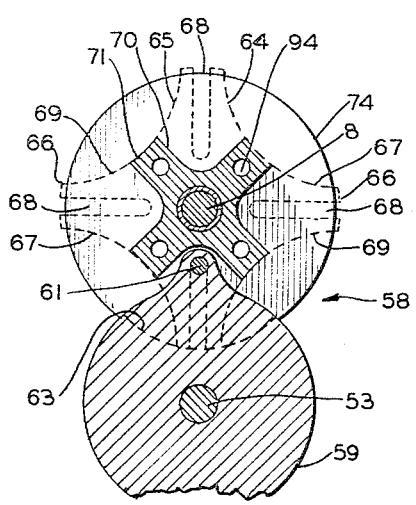
FIGURE 9 is a fragmentary sectional view similar to FIGURE 7 and showing the Geneva mechanism showing part of the present apparatus in a slightly different position.
Figure 10:
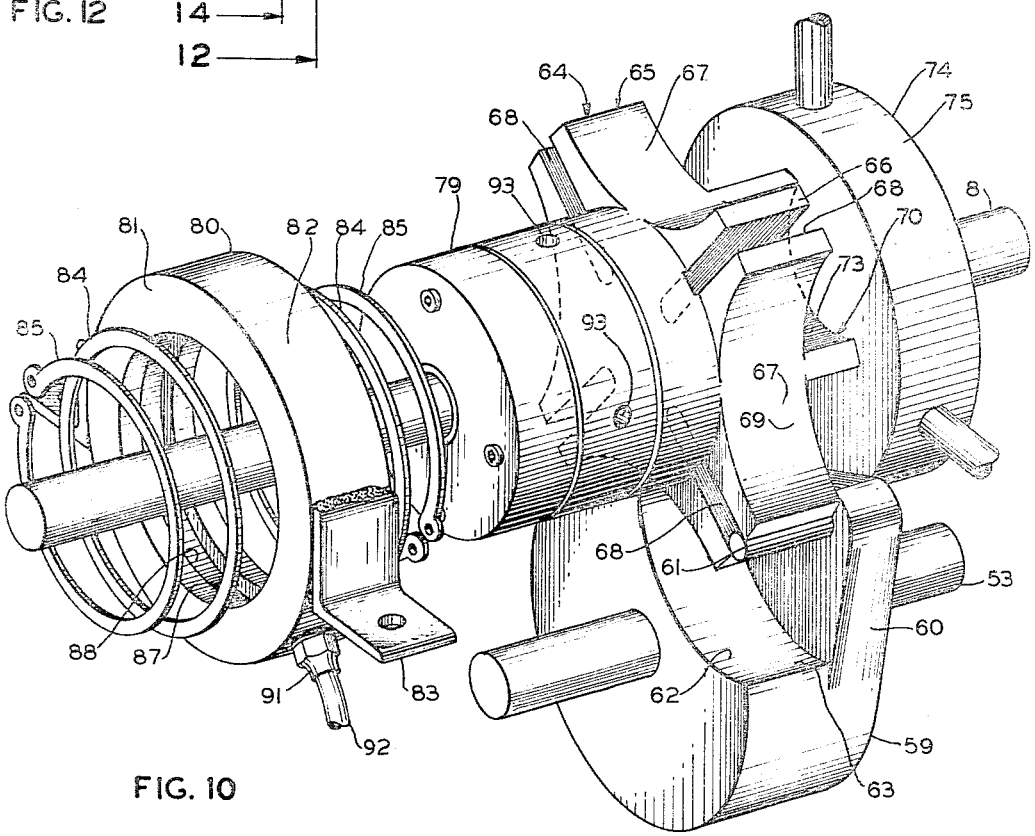
FIGURE 10 is an exploded perspective view of the Geneva mechanism and pneumatic control system forming part of the present electrostatic printing apparatus.

Rigidly secured to or otherwise integrally formed with the rearwardly presented surface of the web-wheel 70 is a turret 74, substantially as shown in FIGURES 4, 8 and 10. The turret 74 is provided with an annular side wall 75 which is drilled in the provision of four radially spaced bores 76 and which are internally threaded to accommodate mandrel shafts 77 having lower threaded ends 78. It should be understood that each of the mandrel shafts 77 extend outwardly in parallel relationship to each of the arms 71 of the web-wheel 70. Thus, by reference to FIGURES 6, 7, 9 and 10, it can be seen that the mandrel shafts 77 extend outwardly from the turret 74 at an angle which is midway between each of two radially spaced crowns 66. Thus, the shaft 77 extends outwardly at an angle of 45° with respect to each of the pin engaging slots 68.

Integrally formed with or otherwise rigidly secured to the forwardly presented surface of the slot-wheel 65 is a forwardly projecting coaxially extending valve drum 79 which is sized for concentric disposal within a valve manifold 80 having end walls 81 and an annular side wall 82. Welded to the annular sides wall 82 are a pair of diametrically opposed L-shaped brackets 83 and which are bolted or otherwise rigidly secured to the manifold support frame 50 for retaining the valve manifold 80. A pair of washers 84 and a pair of lock rings 85 are disposed on opposite sides of the valve manifold 80 and which bear against the end side walls 81 for sealing the manifold 80 and holding the manifold in axial alignment with the valve drum 79. Furthermore, it can be seen that the valve drum 79 is annularly grooved in the provision of a pair of annular slots to accommodate sealing rings 86. The sealing rings 88 may be formed of any suitable material normally employed in the manufacture of sealing rings, such as neoprene rubber.

The valve manifold 80 is formed of a hollow cylinder and is internally bored forming an interior wall 87. The manifold 80 is also formed on the interior wall with an annular primary air passage or recess 88. The primary air passage 88 is generally maintained under conditions of reduced air pressure and for the purposes of the present invention, is often referred to as a "vacuum passage." A suitable source of air under reduced pressure (not shown) may be supplied to the primary air passage 88 through a tube or line 89 connected to a fitting 90 which is, in turn, connected to the valve manifold 80 and communicates with the primary air passage 88. The manifold 80 is also provided with a second fitting 91 for retaining an air line 92 for reasons which will presently more fully appear. The air line 92 is connected to a suitable source of air pressure (not shown).

The valve manifold 80 is so positioned so that the air passage 88 remains in continuous fluid-type contact with four radially spaced radially extending fluid ducts 93. Moreover, by reference to FIGURE 4, it can be seen that the sealing rings 86 bear against the interior walls 87 on opposite sides of the air passage 88. The four radially spaced fluid ducts 93 in the valve drum 79 in turn communicate with four axially extending fluid ducts 94. By further reference to FIGURE 5, it can be seen that the axial fluid ducts 94 are in continual communication with the radial ducts 93. Moreover, it can be seen that the axial fluid ducts 94 extend through the valve drum 79, the slot-wheel 65, each of the arms 71 in the web-wheel 70 and through the turret 74. The axial fluid ducts 94, which extend through the turret 74 in turn communicate with the radial bores 76. Thus, it can be seen that fluid can be provided to the mandrel shafts 77 by passage of fluid through the line 89, the fitting 90, the annular passageway 88, through the radial fluid ducts 93 and the axial fluid ducts 94. The fluid is then delivered to the hollow mandrel shaft 77. The slot-wheel 65, the turret 74, the web-wheel 70 and the valve drum 79 may be integrally formed as a cast-in-place unit and milled to the desired degree of tolerance. However, each of these components could be formed as a unit with one or more of the components being added. Also, it is possible that each of the components can be separately manufactured and welded together in the manner as shown in FIGURE 10. Furthermore, it can be seen that this entire unit serves as a quill member and is rotatable with respect to the transversely extending drive shaft 8 which also serves as the secondary Geneva shaft.

It should be recognized that the component 58 is termed a "primary Geneva mechanism," and the component 64 is termed a "secondary Geneva mechanism" whereas in fact, these two components do not form a true Geneva mechanism. However, the terminology of the conventional Geneva mechanism has been employed as the unique drive disclosed herein operates on a principle similar to the operation of the conventional Geneva mechanism. However, it is pointed out that the drive mechanism provided herein is not the conventional well known Geneva mechanism.

Rotation of the transversely extending drive shaft 8 will rotate the driving pinion gear 55 which will in turn rotate the driven pinion gear 56 and the primary Geneva shaft 53. It can thus be seen that as the drive shaft 8 is continually rotated, the primary Geneva shaft 53 will be continually rotated. However, it can also be seen that since the secondary Geneva mechanism 64 in effect, forms a quill member on the drive shaft 8, it will not necessarily rotate with the drive shaft 8. Rotation of the primary Geneva shaft 53 will cause the pin-wheel 59 to rotate in a clockwise direction, reference being made to FIGURE 10. As this occurs, the annular side wall of the pin-wheel 59 will be slightly spaced from the concave guide surfaces 69 in one quadrant. Inasmuch as the guide surface 69 has the same radius of curvature as the annular surface of the pin-wheel 59, the secondary Geneva mechanism 64 and the slot-wheel 65 will not rotate on the main drive shaft 8. Continued rotation of the pin-wheel 59 will cause the outwardly extending pin 61 to engage a slot 68 in the next adjacent crown 66. Engagement of the pin 61 in the next adjacent slot 68 is more fully shown in FIGURE 6. Continued rotation of the pin-wheel 59 will cause the slot-wheel 65 to rotate in a counter-clockwise direction, reference being made to FIGURES 6, 9 and 10 until the position as shown in FIGURE 9 is attained. Again, the continued rotation of the pin-wheel 59 will continue to rotate the slot-wheel 65 until the pin 61 again reaches the position as shown in FIGURE 10. It can be seen that the pin-wheel 59 rotates for approximately 270° during the time that the slot-wheel 65 remains in a stationary position on the drive shaft 8. The additional 90° rotation of the pin-wheel 59 through a 90° angle will cause the pin 61 to move upwardly in one of the slots 68 and cause the slot-wheel 65 to rotate in a counter-clockwise direction, reference being made to FIGURES 6 and 10, through a 90° angle until the pin 61 moves downwardly in a slot 68. During the portion of the time that the pin 61 is engaged in the slot 68, the lobe 60 will fit into one of the rectangularly shaped reliefs 73 in the web-wheel 70. This type of actuation is more fully illustrated in FIGURES 6–10 showing the various positions of the primary and secondary Geneva mechanisms during actuation thereof.

The primary air passage 88 is not completely annular around the interior wall 87 on the valve manifold 80 and extends for an angle for approximately 330°. A secondary air passage 95 is also formed on the interior wall 87 and has an overall angle of approximately 30°. The secondary air passage 95 is separated from the air passage 88 by means of a pair of inwardly extending flanges 96 which are integrally formed with the interior wall 87. By further reference to FIGURE 5, it can be seen that the fitting 91 and the air line 92 connected thereto are in fluid communication with the secondary air passage 95 for supplying air under pressure thereto. By reference to FIGURES 5 and 10, it can be seen that each of the mandrel shafts 77 will pass the secondary air passage 95 during the rotation of the turret 74. When all mandrel shafts 77 are located so that the valve drum 79 is in the position as shown in FIGURE 5, all mandrel shafts 77 will be maintained under a vacuum since the primary air passage 88 is maintained in operative communication with the source of reduced air pressure through the line 89. However, as the valve drum 79 rotates with the secondary Geneva mechanism 64, each succeeding mandrel shaft 77 will be placed in fluid communication with the secondary air passage 95. Air will then travel through the radial fluid duct 93, through the axial fluid duct 94 and through the mandrel shaft 77. It is to be noted that the secondary air passage 95 has a sufficient radial distance so that no air-lag is present. In other words, air under pressure will have sufficient time to reach the end of the mandrel shaft 77, for reasons which will presently more fully appear, during the portion of the time that each of the radial fluid ducts 93 is maintained in communication with the secondary air passage 95.

While it is recognized that the unique drive mechanism disclosed herein is not the conventional Geneva mechanism, it should be understood that the drive mechanism herein disclosed could be modified in much the same manner as a conventional Geneva mechanism to make a multiposition drive mechanism. For example, it is possible to employ a six or eight position drive mechanism by using a 6 or 8 position slot-wheel.

The secondary Geneva mechanism 64 with the valve drum 79 secured thereto as indicated, functions as a quill member on the drive shaft 8, the latter of which also serves as the secondary Geneva shaft. Rigidly secured to the rearward end of the drive shaft 8 by means of a Woodruff key 97 and a set screw 98 is a continually rotating friction wheel 99, substantially as illustrated in FIGURES 2 and 4.

Figure 11:
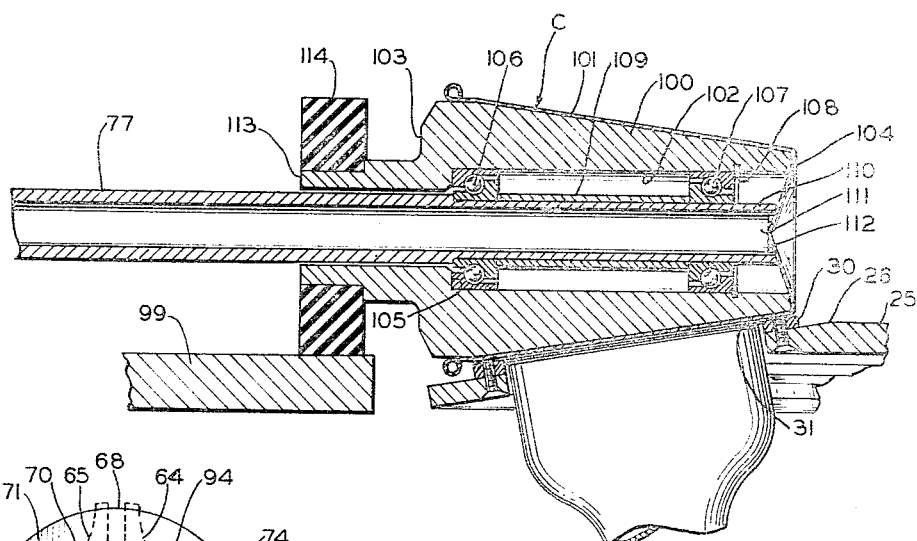
FIGURE 11 is a horizontal fragmentary sectional view taken along line 11—11 of FIGURE 3 and showing the construction of the cup supporting mandrel forming part of the present apparatus.

Rotatably mounted on the outer end of the mandrel support shaft 77 is a conically-shaped container supporting mandrel 100 which is more fully illustrated in FIGURE 11. The container supporting mandrel 100 is generally formed of a frustro-conical shape and has an annular tapering side wall 101 and a hollow interior forming an axial chamber 102. The mandrel 100 is also provided with a relatively flat centrally apertured end wall 103 and a somewhat concave end wall 104. The interior chamber 102 is formed with a relatively flat shoulder 105 for retaining a roller bearing 106 and axially spaced from the bearing 106 is a second roller bearing 107 which is in turn retained in position by means of a locking ring 108. Each of the bearings 106, 107 are held in axial alignment by means of a spacer sleeve 109 which abuts against opposed margins of each of the bearings 106, 107 substantially as shown in FIGURE 11.

As indicated above, a mandrel 100 is positioned on the outer end of each of the four mandrel support shafts 77 so that they are positioned to align with each of the electrostatic printing screens 31, 48 in a manner to be hereinafter more fully described in detail. By reference to FIGURE 11, it can be seen that the mandrel 100 is positioned on a reduced outer end of the mandrel shaft 77. The outermost bearing 107 may be disposed about a locking ring as desired, in order to retain the mandrel 100 on the reduced portion of the mandrel shaft 77. At its outer end, the reduced portion of the mandrel shaft 77 is provided with a cup engaging open ended extension 110 having an inwardly presented concave surface 111 to match the concave surface of the end wall 104 on the mandrel 100. The extension 110 is provided with a plurality of radially spaced axially extending container engaging fingers 112 for engaging the bottom wall of a container C which may be disposed thereon. The container engaging fingers 112 are designed to engage the bottom wall of the container C in order to prevent collapsing of the container bottom wall when a vacuum is supplied to the mandrel shaft 77 and to the mandrel 100. It can be seen that the mandrel shaft 77 is hollow and communicates with the axial fluid duct 94 in the manner previously described. Accordingly, it can also be seen that a vacuum and air pressure is applied to the outer end of the mandrel 100 in timed relation to the rotation of the secondary Geneva mechanism 64.

Thus, when it is desired to eject a container C from the mandrel 100, air is applied to the outer end of the mandrel 100 through the mandrel shaft 77 for forcing the container C off of the mandrel. On the other hand, when it is desired to retain the container C on the mandrel 100 during the electrostatic printing operations, it can be seen that the mandrel 100 is maintained in vacuum communication through the axial fluid duct 94 and with the source of vacuum. The end wall 103 of the mandrel 100 integrally merges into an axially extending hub 113 which is diametrally reduced to accommodate a roller wheel 114, the latter being in engagement with the outer peripheral margins of the annular surface on the friction wheel 99. Thus, it can be seen that inasmuch as the friction wheel 99 is continually rotating through the action of the drive shaft 8, the mandrel 100 will be continually rotating with respect to the mandrel shaft 77 through the action of the roller wheel 114.

The container supporting mandrel 100 is designed to accommodate disposable, nestable, thin-walled, plastic cups of the type which are commercially available and usually found in vending machines. However, it should be understood that the mandrel 100 can be readily removed and replaced with a similar mandrel accommodating cups or containers of a different size and shape. In this connection, it should be obvious that it is possible to provide mandrels to accommodate such containers as ice cream containers, cheese containers, or any similar open-ended container of this type. Moreover, it should also be understood that the present invention is not limited to the printing of plastic containers but can be employed to suitably print containers formed of paper, paperboard, etc.

By further reference to FIGURE 11, it can be seen that the mandrel 100 is located at the frustro-conical surface 44 of the screen support frame 43. Thus, it can be seen that the annular wall 101 parallels the frustro-conical surface 44, which also retains the electrostatic printing screen 48. Thus, it is possible to employ the principles of printing on curved surfaces in the manner described in copending application Serial No. 472,829, filed July 19, 1965. In the printing of curvilinear shaped surfaces such as on conically shaped containers, the container is positioned in an axis of rotation so that the exterior wall thereof tangentially approaches and departs from the screen. Thus, printing will occur along an elemental line of closest approach between the container C and the electrostatic printing screen. Moreover, the mandrel 100 with the container supported thereon is rotated at approximately the same rate of speed or at the same peripheral speed as the movement of the screens 31, 48 so that a continuing line of tangency occurs between the surface of the container supported on the mandrel and the surface of the screens 31, 48. Simultaneously with the rotation of the container C supported on the mandrel 100 and the rotation of the screen support frame 43 which moves each of the screens 48 in timed relation to the rotation of the mandrel 100, electroscopic ink will be passed through the screen 48 to the container C in a manner hereinafter described. The ink particles are passed through the screen 48 along this line or band of tangency. In this manner, it is possible to provide electrostatically printed images on the surface of a curvilinearly shaped article, such as a conically shaped container.

By the process of the present invention, and by using the techniques employed in said copending application Serial No. 472,829, filed July 19, 1965, it is also possible to use contact electrostatic printing between the substrate and the electrostatic printing screen. In this process, the flat surface of the container C is retained in very light tangential contact with the surface of the electrostatic printing screen. Both the screen and the container C are moved so that a line of continuing light tangential contact is maintained therebetween and electroscopic ink is applied through the screen to the container C at this line of tangential contact. Thus, it should be understood that the rolling wheel 114 should be sized so that the speed of rotation of the mandrel 100 is such that it has the same peripheral speed as the movement of the screen support frame 43 and the electrostatic printing screen 48. The same relationship exists between the screen support frame 25 with the screen 31 and the mandrel 100 as exists with the screen 48.

Welded or otherwise rigidly secured to the rearwardly spaced longitudinal support channel 4 is a feeding mechanism support frame 115 for retaining a suitable air operated ink feeding mechanism 116, which is designed to supply electroscopic ink to the electrostatic printing screens 31 on the screen support frame 25. Similarly welded to the support column 32 is an outwardly extending support frame 117 for retaining an air operated ink feeding mechanism 118 designed to supply electroscopic ink to the electrostatic printing screens 48 on the screen support frame 43. Each of the ink feeding mechanisms 116, 118 is similar to the air operated ink feeding mechanism described in my copending application Serial No. 461,044, filed June 3, 1965 and moreover, each of the ink feeding mechanisms 116, 118 is substantially identical. Therefore, only one of the ink feeding mechanisms 116 is described and illustrated in detail herein. It should be recognized that other types of ink feeding mechanisms which are not based on an air operation principle may also be employed and that the present invention is not specifically limited to an air operated ink feeding mechanism.

It has been found in connection with the present invention, however, that an air operated ink feeding mechanism provides substantially superior results due to the fact that the electroscopic ink particles employed in electrostatic printing operations are relatively small and extremely light in weight, are readily compressible and very difficult to control. Particles of this type have a tendency to cling together in agglomerates and due to the resinous nature thereof tend to become permanently bonded when subjected to even moderate compression. The mechanical systems for delivering electroscopic ink create undesirable situations in that heat and friction have been generated at the place of contact between the mechanical mechanism, such as the rotating brush and the image screen or other transfer media. Moreover, the inks which are used in this type of system are thermoplastic in nature and, therefore, are sensitive to both heat and pressure with regard to softening and fusing. Consequently, the air operated ink feeding mechanism of the present invention substantially eliminates the various problems in delivery which have been present in devices of the prior art.

The air operated ink feeding mechanisms 116, 118 are more fully illustrated in FIGURES 16–18. A positioning mechanism is interposed between each of the ink feeding mechanisms 116, 118 and the frames 115, 117, respectively. The ink feeding mechanism 116 is further described in detail and generally comprises an upstanding hub 119 welded or otherwise rigidly secured to the feeding mechanism support frame 115. Rotatably disposed within the hub 119 is a pivotal shaft 120 and secured to the outer ends of the shaft 120 is the clevised end of support plate 121. The plate 121 is supported at its opposite ends by means of an adjustable bolt 122 capable of being locked by a pair of locking nuts 123. A compression spring 124 circumferentially disposed about the shank of the bolt 122 tends to bias the plate 121 upwardly against the action of the bolt 122. Thus, by releasing the locking nuts 123 the bolt 122 can be turned for angularly positioning the plate 121 with respect to the vertical. The bolt 122 at its upper end is secured to the support plate 121 by means of a pin 125.

Integrally formed with the support plate 121 is an upwardly extending dovetail slide 126 formed with a mortise 127 and a tenon 128 providing laterally shiftable adjustment of the ink feeding mechanism 116. The tenon 128 can be locked in place by means of a locking bolt 129, which extends through the motrise 127 and engages a wall of the tenon 128 in the manner as shown in FIGURE 16.

The tenon 128 is integrally formed with extended mounting plates 130, 131 and supportively disposed on the upper surface of the mounting plates 130, 131 is a retaining plate 132. The retaining plate 132 is pivotally secured at its forward end to the mounting plate 131 by means of a pivot pin 132', substantially as shown in FIGURES 16 and 17. By means of this construction, the retaining plate 132 is pivotal on the mounting plates 130, 131. Moreover, the mounting plate 130 is provided with an adjustable bolt 133 and which extends through an arcuate elongated slot 134 in the retaining plate 132 for locking the retaining plate 132 in any of a plurality of arcuately disposed positions with respect to the plate 130. The locking bolt 133 is preferably provided with a nut 134' as illustrated in FIGURE 16.

Welded or otherwise rigidly secured to the upper surface of the retaining plate 132 are a pair of transversely extending guide channels 135, slidably accommodating a transversely shiftable mounting frame 136, which comprises a pair of longitudinally spaced transversely extending guide plates 137 and a support plate 138. The mounting frame 136 is biased forwardly toward either of the screen support frames 25 or 43 by means of a plunger 139, which is disposed within the guide channel 135, rearwardly of the mounting frame 136 and is biased forwardly by means of a compression spring 140. The plunger 139 is provided with a rod 141, which extends coaxially through the compression spring 140 and is provided at its outer end with a pair of locking nuts 142 for adjusting the forward bias maintained on the mounting frame 136. Thus, by adjusting the pair of locking nuts 142, it is possible to adjust the amount of forward bias delivered to the mounting frame 136 for reasons which will presently more fully appear.

The ink feeding mechanism 116 generally comprises a hopper 143, which may be molded or formed of any suitable synthetic resin or plastic material or any material which is inert with respect to the electroscopic ink contained therein. The hopper 143 is provided with an internal chamber 144, which constitutes a fluidized ink reservoir. The electroscopic ink is maintained in a fluidized state or so-called "fluid" state and may be fluidized by any conventional process such as passing low pressure air through a porous membrane on which the ink particles are maintained in combination with a vibratory action. The internal chamber 144 is formed by relatively flat front and back walls 145, 146 respectively and flat interior end walls 147; the front and back walls 145, 146 merging at their lower ends into an arcuately shaped bottom wall 148. The bottom wall 148 is provided with an elongated discharge slot 149, which extends the transverse length of the chamber 144, that is to say, it extends the distance between the side walls 147. The hopper is open at its upper end and is provided with a removable cover plate 150 in the manner as shown in FIGURE 16.

The end walls 147 are bored to accommodate bearings (not shown) and extending transversely therethrough and journaled in the bearings is an agitator shaft 151. The shaft 151 is provided with an extended end 152 and secured to the extended end 152 thereof is a pulley 153. The agitator shaft 151 is driven by means of an electrical motor 154 mounted on the back wall 146 by means of brackets 155 and which is connected to the pulley 153 by means of a drive belt 156. The motor 154 should have a mechanism for providing variable speed and should preferably be of the explosion proof type. The agitator shaft 151 is axially positioned by means of set collars 157 which engage the interior surfaces of the end walls 147, substantially in the manner as shown in FIGURE 17. Secured to the set collars 157 is an agitator 158 consisting of four radially spaced rectangularly shaped agitator blades 159. The ends of the blades 159 are inserted in small apertures formed in the set collars 157 and are retained by means of set screws substantially as shown in FIGURES 16 and 17. By reference to FIGURE 17, it can be seen that the agitator blades 159 are provided with two radially extending leg portions 160 which are disposed in close proximity to the end walls 147 and are connected by a bight portion 161, which is sized to closely approach the interior surface of the front and back walls 145, 146 and the bottom wall 148. Moreover, the agitator blades 159 are circular in cross section and have a relatively small diametral size in the area of $\frac{1}{32}''$. The pulley 153 may also be of a variable diameter pulley as illustrated, in order to obtain a desired speed of the agitator 158. Thus, it is possible to rotate the agitator 158 at a desired speed which is just sufficient to maintain the ink particles in a levitated or fluidized state.

The hopper 143 is provided with a relatively thick base 162 which is rigidly secured to the upper surface of the mounting frame 136 so that the ink feeding mechanism 116 is in effect shiftable within the guide channels 135. Rigidly secured to the base 162 of the hopper 143 is a forwardly and outwardly projecting arm 163 which is provided with a clevised end 164 for retaining a roller 165 in the manner as shown in FIGURE 17. The roller 165 is designed to ride along the rearwardly presented flat surfaces of each of the screen support frames 25, 43. The screen support frames 25, 43 are also provided with camming ridges 166 in alignment with the rollers 165 in the areas between each of the electrostatic printing screens 31, 48. Thus when the electrostatic printing screens 31, 48 are not in alignment with the ink feeding mechanisms 116, 118 the roller 165 will ride upon the camming ridge 166 causing the ink feeding mechanisms 116, 118 to be shifted rearwardly within the guide channels 135 against the action of the compression spring 140. When the roller 165 is removed from riding engagement with the camming ridge 166, the ink feeding mechanisms 116, 118 will be projected forwardly by means of the action of the compression springs 140.

The base 162 is longitudinally bored in the provision of an ink distributing chamber 167 having arcuately shaped side walls 168 which merge at their lower ends with the bottom wall 148 at the discharge slot 149. The chamber 167 is sized to accommodate a distributor roller 169 which is mounted on a roller supporting shaft 170, the latter of which is provided with a pulley 171 at its outer end. The roller supporting shaft 170 may be conventionally retained by means of set collars and washers (not shown). The roller supporting shaft 170 is similarly driven through a drive belt 172 trained around the pulley of the motor 154 and around the matching pulley 171 in the manner as shown in FIGURE 16.

The distributor roller 169 is provided on its annular surface with a relatively thick brush-like fabric 173, preferably formed of a mohair pile fabric. The fabric 173 may be secured to the annular surface of the distributor roller 169 in any conventional manner such as by a suitable adhesive. It has been found in connection with the present invention that when the fabric 173 is formed of a foamed elastomer material, very effective results have been obtained. The only important criterion in the selection of the fabric 173 is that it must be capable of sealing the discharge slot 149 and yet have a sufficient number of cavities or interstices into which electroscopic ink powder can be deposited and subsequently transferred. By reference to FIGURE 16, it can be seen that the distributor roller 169 is so located that the fabric 173 extends upwardly through the discharge slot 149 and into the chamber 144 and thereby forms an effective sealing means for the chamber 144. Through this construction, the bristles of the fabric 173 are able to engage the fine mesh particles of electroscopic ink contained within the hopper 143 where the particles of ink will become deposited in the interstices of the fabric 173. It has also been found that the fabric 173 must have a different triboelectric charging potential than the ink which is selected for use in the electrostatic printing system. Furthermore, it can be seen by reference to FIGURE 16 that the ink distributing chamber 167 is designed so that it just accommodates the diametral size of the roller 169. Thus, the ink which is engaged by the bristles of the fabric 173 is retained in the interstices of the fabric 173 until it is deposited in a transfer area to be hereinafter described.

Any of a variety of electroscopic inks can be employed in the present invention. Generally, the electroscopic inks comprise a finely dispersed powder which is capable of being triboelectrically charged. The powder generally carries a desired pigment. A number of satisfactory powders can be employed in the present invention and each must be in a finely divided state. Suitable powders are dyed thermoadhesive resins such as rosin, gum copal, gum sandarac, ethyl cellulose, Egyptian asphalt and the like. A very satisfactory thermoadhesive powder can be produced by dissolving equal parts of ethyl cellulose and Vinsol resin in acetone together with a small amount of spirit soluble aniline dye such as Nigrosine or aniline blue and spray drying the solution to produce an extremely fine powder having substantially spherical particles. Dyed Lycopodium powder is suitable where thermoadhesive properties are not required of the powder, as is also starch, cellulose flour, powdered metal and copper powder.

Whether fusible, thermoadhesive or non-fusible powders or others are used, the particle size is preferably near the limit of definition of the eye under ordinary reading conditions. Excessive powder size contributes to graininess in appearance of the image. On the other hand, extremely fine powder may be undesirable in many instances due to its tendency to "ball up" or cling together in clusters. It is, therefore, desirable to use a powder in which substantially all the particles are within the size range from 2 to 10 microns. If spherical powders are used, this refers to their diameters, otherwise to the largest dimension. For most purposes, it is preferred to use an equidimensional powder particle, the sphere being the preferred form.

The base 162 is transversely bored to accommodate an ink delivery tube 174, which is connected at one end to a suitable source of air pressure (not shown). The ink delivery tube is cut away in the provision of an ink receiving slot 175 at a point immediately beneath the distributor roller 169. The tube 174 is formed with a pair of arcuately shaped, internally extending flanges 176, which, in effect, form continuations of the arcuate side walls 168 in the manner as shown in FIGURE 16.

The base 162 is vertically drilled and the ink delivery tube 174 is further cut away in the provision of a plug receiving slot 177 for accommodating an adjustable plug 178. The space between the lower margin of the ink delivery roller 169 and the upper surface of the plug 178, forms an air gap 179 which constitutes an ink transfer zone. The plug receiving slot 177 is sized so that the plug 178 fits snugly therein and is vertically shiftable therein. The tolerance between the plug 178 and the plug receiving slot 177 is such that vertical shifting movement is permitted and yet air or ink particles will not pass around the annular side wall of the plug 178 and out of the ink delivery tube 174. The plug 178 is provided with a crowned upper surface or top wall 180, which may be adjusted so that the top wall 180 is shifted to a position where it is almost in contact with the lower margin of the roller 169. The relative position of the plug 178 can be adjusted by means of a bolt 181 which is threadedly retained in the plug 178. The plug 178 is normally biased downwardly against the retaining force of the support plate 138 by the compression spring disposed around the stem of the bolt 181 and which bears against the support plate 138. Thus, by adjustment of the bolt 181, it is possible to provide a desired height of the plug 178 in the ink transfer zone 179.

On the downstream side, the ink delivery tube 174 integrally merges into an ink feed nozzle 182, which has a relatively small height and relatively wide width. By reference to FIGURE 18, it can be seen that the width of the nozzle 182 is approximately equal to the width of the electrostatic printing screens 31, 48. Furthermore, it can be seen that the nozzle 182 terminates in very close proximity to the screen surface so that the air gap presented between the surface of the electrostatic printing screens and the nozzle 182 is only about 0.005" to 0.12". For the purposes of the present invention, it has been found that when the nozzle is produced with a height relative to the direction in which the screen moves, within the range of 1/16 to 1/4 inch, optimum results have been obtained. Accordingly, the feed nozzle 182 is provided with a feed aperture 183 at its outer end. In this manner, a relatively thin line of electroscopic ink, which is substantially equal to the width of the electrostatic screens is delivered to the screens. Accordingly, the screens receive a continually applied, relatively thin line of ink from the nozzle 182, as the screens move past the nozzle. As indicated above, in the areas of the screens which are provided with image openings, the electroscopic ink will pass therethrough to the container C established immediately behind the screen on the mandrel 100.

An air removal system 184 is provided for removing the fluid which carries the ink particles to the electrostatic printing screens. If the air was forced through the openings of the screen or designed to carry the ink particles through the open portions of the screens, the final print on the container C would be blurred. Moreover, the so-called "ghosting" problems would then arise. Accordingly, the air removal system 184 is designed to reduce the air velocity to substantailly zero at the nozzle feed aperture 183, so that the ink particles which are triboelectrically charged, in a manner hereinafter described, will be carried by an electrostatic field created between the electrostatic printing screens and the mandrels 100.

The air removal system 184 generally comprises an exhaust tube 185 which is disposed around the nozzle 182 in the manner as shown in FIGURE 16. Thus, it can be seen that the exhaust tube 185 is provided with a relatively wide width, slightly larger than the width of the electrostatic printing screens 31, 48 and a height which is slightly greater than the height of the discharge nozzle 182. Moreover, the exhaust tube 185 is provided with an intake aperture 186 on its end which is terminal to the feed aperture 183. The exhaust tube 185 forms part of an exhaust manifold which is in turn connected to any suitable vacuum device (not shown) for removing the air which carries the ink particles into the delivery tube 174. The air removal system including the exhaust tube 185 is shiftable along the length of the discharge nozzle 182 so that the position of the intake aperture 186 can be adjusted with respect to the feed aperture 183. The exhaust tube 185 may be releasably secured to the discharge nozzle 182 at selected positions through conventional clamps 187. However, it should be pointed out that the air intake aperture 186 normally terminates in approximately the same vertical plane as the feed aperture 183 and can be extended therefrom to a maximum distance of approximately 1/4 inch.

The ink delivery tube 174 is preferably formed of the same material which is used in the construction of the ink hopper 143. However, the ink delivery tube 174 is provided with a metal shield (not shown) on its interior surface in the area immediately before the tube 174 merges into the feed nozzle 182. This metal shield on the interior surface of the tube 174 serves as a charging chamber. The air pressure is sufficient so that it is capable of picking up the electroscopic ink contained in the interstices of the bristles in the fabric 173 and carrying the same into the charging chamber. The ink particles which are carried into the air stream will be continually bombarded against the metal shield and hence become triboelectrically charged. It has been found in connection with the present invention that an air pressure on the upstream side of the distributor roller 169 and the plug 178 can be as much as three to four pounds per square inch and still produce very suitable results. If it is desirable to provide additional charging of the electroscopic ink particles, a series of longitudinally spaced transversely extending corona discharge wires (not shown) may extend across the feed nozzle 182. The corona discharge wires would normally be connected to a suitable source of electrical power which is sufficient to electrically charge the ink particles as they pass through the feed nozzle 182. This type of charging has also been found to be very effective inasmuch as the ink particles are not readily susceptible to losing the charge if they should contact another metal surface having a lower charging potential than the ink particle itself. In effect, through the use of the corona discharge, the air around each of the ink particles becomes ionized and hence, the particle is more readily able to maintain its electrical charge as it enters the electrostatic field.

The exhaust maintained on the exhaust tube 185 is sufficient just to remove the air which carries the electroscopic ink particles. Due to the difference in molecular weights and densities of the ink particles and the air particles, the air will be removed while the momentum of the ink particles is sufficient to carry the ink particles through the electrostatic printing screen where they are caught in the electrostatic field between the screens and the container C. The ink will then pass through the open areas of the screens and form the desired image on the container C in a manner to be hereinafter described in more detail.

It is possible to use a belt-feed type of ink delivery system of the type described in copending application Serial No. 453,706, filed May 6, 1955, which is also efficiently employed in electrostatic printing operations of the type performed by the apparatus A. This type of electrostatic printing apparatus includes a hopper for containing the desired electroscopic ink and rotatably mounted in the hopper is a continuously moving agitator for keeping the ink particles in a suspended or levitated state. A distributor roller is disposed beneath the hopper and communicates internally therewith to receive a charge of ink and deposit the same on a continuously rotating belt. The distributor roller in combination with the agitator of the hopper also functions as a metering roller for metering a preselected charge of the ink. Provided for operative communication with the surface of the belt is a charging roller with a surface speed different from the surface speed of the belt. The charging roller also aids in providing an even distribution of ink particles transversely across the belt and for creating a triboelectric charge on the ink particles contained on the surface of the belt. The belt is driven by a pair of rollers, one of which is charged and serves as the discharge electrode in the electrostatic printing system. This type of feeding mechanism is also provided with a series of suitable adjustments in order to vary dimensions and distance between the moving parts, which are essential for providing a wide degree of utility so that the feeding mechanism and hence the electrostatic printing apparatus A is capable of handling a wide variety of types and sizes of electroscopic inks.

Bolted to the upper surface of the right end transverse channel 5 is a pair of transversely spaced upstanding brackets 188 and secured to the brackets 188 is a container dispensing mechanism 189 for intermittently depositing a container C on each of the mandrels 100 as they pass the container dispensing mechanism 189. The container dispensing mechanism 189 is more fully illustrated in FIGURES 12–15 and generally comprises an outer housing 190, which is preferably former of aluminum or other lightweight metal and is somewhat circular in vertical cross section, reference being made to FIGURE 12. The housing 190 as indicated is circular and is slightly larger than the containers C which are passed through the housing 190. The housing, of course, is connected to a suitable mechanism for supplying each of the containers C thereto in a stacked relation. A conventional stacking mechanism and conveyor system (not shown) may be employed for providing a continual delivery of containers C.

The housing 190 is provided with an enlarged retaining section 191 and integrally formed on the interior surface thereof are four (4) inwardly extending radially spaced flutes 192 which serve as container guides. By reference to FIGURE 12, it can be seen that the four flutes or container guides 192 form a circle, the diameter of which is substantially equal to or marginally larger than the rims of the containers C so that the containers C are, in effect, held in axial alignment within the enlarged retaining section 191. Furthermore each of the flutes 192 is provided with outwardly flaring edges 193 at their rearward ends, reference being made to FIGURE 12, which serve as tapered guide surfaces. Thus as the container C passes through the housing 190, it will strike the guide surfaces 193 and become guided into the retaining section 191. The housing 190 is also suitably connected to a source of air pressure (not shown) which is employed for moving the containers C within the housing 190.

The enlarged retaining section 191 integrally merges into a discharge tube 194 which has a marginally larger diametral size than the rim of the container C. Welded or otherwise rigidly secured to the side wall of the housing 190 at the area of adjoinment of the enlarged retaining section 191 and the discharge tube 194 are a pair of U-shaped guides 195. Movably disposed within the guides 195 is a first vertically shiftable retaining frame 196 and a second vertically shiftable retaining frame 197, each of which is connected and movable together by means of a spacer block 198, which interconnects the two retaining frames 196, 197 by means of bolts or rivets 199. The retaining frames 196, 197 each have pairs of transversely spaced vertically extending legs 200, 201, respectively and which are connected by crossbars 202, 203, respectively. Moreover, each of the pairs of legs 200, 201 are guided in their vertical shifting movement by pairs of spacer plates 204, 205, which are mounted in the guides 195 in the manner as shown in FIGURE 12. In effect, therefore, each of the retaining frames 196, 197 is shiftable within U-shaped guide slots.

Mounted on the upper portion of the housing 190 is a pair of spaced upstanding brackets 206 for supporting a conventional solenoid 207, which is electrically connected to a suitable source of electrical current (not shown) and which includes a vertically shiftable plunger 208. At its lower end, the plunger 208 is provided with an enlarged base 209, which limits the vertically shiftable movement of the plunger 208. At its upper end, the plunger 208 is secured to a U-shaped retaining clamp 210, which is, in turn, bolted to the crossbar 202 in the manner as shown in FIGURE 14. Actually, the solenoid 207 is connected to a control circuit which is used in the operation of electrostatic printing apparatus A and is energized in timed relation to the movements of the other components in the electrostatic printing apparatus A. This time related operation is, however, more fully described in detail hereinafter.

By reference to FIGURE 14, it can be seen that when the retaining frames 196, 197 are shifted to their lower positions, that is the position as shown in FIGURES 13 and 14 when the solenoid 207 is de-energized, the legs 201 extend to a point slightly below the horizontal centerline of the container C. Furthermore, at their lower ends, each of the legs 200 are beveled providing reliefs 211 along their interior margin, all as can best be seen in FIGURE 14. The legs 201 of the retaining frame 203 are somewhat longer than the legs 200 and extend below the lower margin of the containers C. The legs 201 are formed with inwardly extending enlarged shoes 212 at their lower ends and which are integrally provided with engageable flanges 213. It can be seen that the flanges 213 are sized to engage the rim of the second container C in the stack when the solenoid 207 is energized and the frame 197 is shifted to its uppermost position. However, the flanges 213 remain out of contact with any of the containers C when the solenoid 207 is de-energized and the frame 197 remains in its lower position, substantially as shown in FIGURE 13. Thus when in the lowered positions, the frame 196 retains all of the containers C in the stack against the air pressure from the rearward end of the housing 190.

When the solenoid 207 is energized responsive to a signal, the plunger 208 will shift the two retaining frames 196, 197 upwardly. As the frame 196 is shifted upwardly, the legs 200, due to the beveled edges 211, will be shifted out of engagement with the first container C in the stack. The air which passes around the containers in the large areas between the flutes 192 in the retaining section will cause the first container C in the stack to eject. However, as both of the frames 196, 197 are shifted upwardly, the enlarged engageable flanges 213 on the shoes 212 will engage the next container C. In FIGURE 15, it can be seen that the solenoid causes the frames 196, 197 to extend to their uppermost position. The flanges 213 have thereby engaged the second container in the stack, permitting the first container C to be ejected. When the solenoid 207 is thereafter de-energized both of the frames 196, 197 will shift downwardly causing the flanges 213 on the shoes 212 to be removed from engagement with the container C which was previously the second container in the stack. However, as the retaining frame 197 shifts downwardly, the frame 196 will also shift downwardly. Therefore, as the flanges 213 are removed from engagement with the container C, it will be urged forwardly through the air pressure in the housing 190 until the container then strikes the walls of the legs 200. As the solenoid 207 is successively energized, successive container ejecting cycles will take place in the manner as described.

Mounted on the uprights 3 substantially as shown in FIGURE 3 is a container discharge funnel 214, which is connected to a discharge tube 215. The tube 215 and funnel 214 are maintained under a vacuum by a suitable vacuum source (not shown) in order to carry the containers in the discharge tube 215 to a suitable collection area (not shown). This type of mechanism is conventional in its construction and is, therefore, not described in detail herein. It should be recognized that the mandrels 100 are normally maintained under a vacuum and the air passage 88 is maintained in communication with the mandrel shaft 77 of each of these mandrels during the portion of the time that they are not in proximate relation to the discharge funnel 214. However, as the mandrels 100 approach the discharge funnel 214, the valve drum 79 is so rotated so that the mandrel 100 through the duct work previously described, is placed in communication with the secondary air passage 95 so that air is fed to the mandrel 100 causing the container C disposed thereon to be ejected. By reference to FIGURE 3, it can be seen that the funnel 214 has a sufficiently large mouth to permit air to pass through the secondary air passage 95 during the portion of the time that the valve drum 79 maintains the radial duct 93 in communication with the air passage 95 so that air is permitted to reach the mandrel 100, while it is in proximate relationship to the funnel 214.

An ink fixing tank 216 is also mounted on and extends between the two lower longitudinal base channels 2 in the manner as shown in FIGURE 3. The ink fixing tank 216 has an arcuate bottom wall 217, which somewhat approximates the arcuate movement of the mandrel 100. This type of association is more fully illustrated in FIGURE 3. The method of fixing the electrostatic printing image is not critical to the present invention and various well known methods in the prior art can be employed, such as the fixing by means of heat or selectively filtered radiation. However, it has been found that solvent vapor fixing of electrostatic printing images has proved to be one of the most effective methods of permanently fixing electroscopic ink on a substrate. In solvent vapor fixing, it is often desirable to construct the solvent tank with cooling coils in order to prevent any of the vapor from escaping into the atmosphere. The cooling coils surrounding the tank, generally along the upper margin, will cause any escaping vapors to condense and drain back into the liquid bath and then become vaporized. The choice of the solvent depends upon the composition of the powder images to be fixed. With powders formed of pigmented rosin, copal, asphalt and other natural resins as well as several synthetic resins and plastics, such as cellulose, a desirable solvent is trichloroethylene. Amylacetate or butylacetate can likewise be used with many resins. Also ethyl alcohol, butyl alcohol and perchloroethylene are particularly useful as they are somewhat less volatile.

It is generally desirable to maintain the solvent in the form of a saturated vapor where the solvent is held at its boiling point. Fusion of the powder image will much more readily take place if the powder is soluble in a solvent. In the fixing chamber, the solvent from the vapor phase condenses on the printed article and is absorbed in the ink powder causing it to soften and coalesce to a continuous film and adhere to the article. It is necessary to adjust the degree of saturation of the solvent vapor and exposure time in order to obtain coalescence and adhesion without absorbing enough solvent to cause excessive liquefication and running of the image. The fusing time in solvent vapor fixing is not usually critical, whereas it may be on plastic articles with heat fusing of thermoplastic based ink. When the substrate is then removed from the vapor chamber, the solvent evaporates from the image and the image solidifies and becomes permanently bonded or fixed onto the substrate, in a matter of a few seconds. In fact, it has been found that the time required for removal of the container C on the mandrel 100 from the chamber 216 is sufficient for evaporation of the solvent before the container C is removed from the mandrel 100 and deposited in the discharge funnel 214.

By reference to FIGURE 3, it can be seen that the electrostatic printing apparatus A is so constituted and arranged that there are, in effect, five work stations which are located in a 360° circle, namely the arcuate movement of at least one mandrel 100 in a full cycle. It can be seen that each of the mandrels 100 rotates in a counter-clockwise direction, reference being made to FIGURE 3 and that each printing cycle actually starts at the point where the mandrel 100 is in horizontal alignment with the container dispensing mechanism 189. Thus, the dispensing of a container C on a mandrel 100, which is located at the container dispensing mechanism 189 constitutes a first work station $S_1$, or so-called "loading station." As the mandrel 100 with the container C supported thereon moves in counter-clockwise direction to the first screen supporting frame 43, it is moved into a printing position for receiving a desired printed image. The printing of the container C at the first screen supporting frame 43 constitutes a second work station $S_2$, or so-called "first printing station." Continued rotation of the mandrel 100 to the screen support frame 25 where the container C similarly receives a printed image, constitutes a third work station $S_3$, or so-called "second printing station." After the container has received the electrostatic images from the second and third work stations, it is transferred to a fixing station $S_4$, which constitutes a fourth work station. After the fixing station $S_4$, the mandrel is rotated until it passes a discharge station, or fifth work station $S_5$, which is formed by the discharge funnel 214. It is to be noted that the mandrel 100 will stop at each of the first four work stations, namely $S_1$, $S_2$, $S_3$ and $S_4$. However, the mandrel 100 continues its rotation between the fourth work station, namely the fixing station $S_4$ and the first station or loading station $S_1$. However, the container C is ejected in the funnel 214 as the mandrel 100 passes through the fifth work station $S_5$.

It should also be recognized that an electrostatic field is maintained between each of the electrostatic printing screens 31, 48 and the mandrels 100. The apparatus A may be conventionally provided with the necessary insulating sleeves and washers and electrical circuit necessary to provide the electrostatic field. This type of construction is conventional and is, therefore, neither illustrated nor described in detail herein. However, it should be pointed out that while current requirements for electrostatic printing of the type herein employed are not heavy in the ordinary sense, a very definite electron current or space current flows across the printing space during the printing operation. It is desirable to have a space current of at least 1 to 2 milliamperes per square inch of printing area. Moreover, the high potential source should be capable of maintaining a desired voltage under current drains in the range of approximately 100 milliamperes or slightly more.

The ink feeding mechanism 116 may also be electrically charged to serve as one of the elements forming the electrostatic field. In actuality, the delivery tube 174 of the ink feeding mechanism 116 would be the element to be established as an electrode. However, any metallic electrode in close proximity to the nozzle 182 of the ink delivery tube 174 could serve as an electrode. In the event that the ink feeding mechanism 116 is employed as one of the poles or electrodes forming the electrostatic field, the ink hopper 143 would be insulated from the remainder of the ink feeding mechanism. The mandrel 100, screens 31 or 48 and ink delivery tube 174 are charged in such manner so that an electric field existing therebetween in the form of a potential gradient. The direction of the potential gradient depends on the charge of the ink particle. If the ink particles are charged positively, the electric field will create a negative charge or less positive charge on the mandrel 100. Generally, an ideal situation exists where the mandrel can be charged in one polarity, the ink delivery tube 174 charged at the opposite polarity and the screen maintained at ground polarity. Thus, if the ink particles were positively charged, the mandrel 100 would be negatively charged and similarly, if the ink particles were negatively charged, the mandrel 100 would be positively charged. It is not necessary to have a positive-negative type potential gradient existing between the three aforementioned components. The potential gradient which exists may be either wholly positive or negative. Thus if the ink particles were positively charged, the ink delivery tube 174, the screens 31 or 48 and the mandrel 100 could have successively less positive charges so that a potential gradient still exists and where this current is capable of moving the triboelectrically charged ink particles from the delivery tube 174 through the screen 31 and to the mandrel 100.

The electrical circuitry may include a high voltage reversing switch (not shown) which is designed to reverse the potential gradient existing between the delivery tube 174, the screen 31 and the mandrel 100. For example, if the mandrel 100 were positive and the delivery tube 174 were negative, position reversal of the switch would cause the mandrel 100 to be charged negatively and the delivery tube 174 to be charged positively. If on the other hand, the potential gradient which existed was all of one charge, position reversal of the switch would reverse the direction of the potential gradient. In this manner, the direction of the lines of force of the electrostatic field which exists between these various components may be reversed. This type of reversal would occur after each printing cycle so that any excess ink which is gathered on the screen would be automatically removed therefrom prior to the start of the next printing cycle with the last named screen.

Operation

In use, the ink hopper 143 is filled with a desired electroscopic ink. The electroscopic ink has previously been fluidized as indicated above, by passing low pressure air through a porous membrane on which the particles are maintained in combination with a vibratory action. It should be recognized that the present invention is capable of providing multicolor electrostatic printing. The ink hopper 143 of the ink feeding mechanism 116 may be filled with one color of electroscopic ink while the ink feeding mechanism 118 may be filled with another color of electroscopic ink. Thus as the container C passes the first printing screen 48 at the station $S_2$, it will receive the first colored ink. As it is shifted to the second printing station $S_3$, it will be printed with an image of the second colored ink. The two images of the two screens 31, 48 may be designed to provide overlying marginal registration of printed images. Therefore, suitable electrostatic printing screens 31, 48 will be mounted within the screen retaining frame 30, 47, respectively. Each of the retaining frames 30, 47 is then secured to the screen support frames 25, 43 in the manner as shown in FIGURE 3. The mandrels 100, which are mounted on each of the mandrel shafts 77, are sized to accommodate containers C which are then loaded into a suitable delivery mechanism for delivery to the container dispensing mechanism 189.

As indicated above, the accurate positioning of the ink feeding mechanisms 116, 118 is important in electrostatic printing operations in order to obtain fine print definition and to prevent "ghosting" effects on the container which is to be imprinted. It can be seen by reference to FIGURE 1 that the ink feeding mechanism 118 is angularly positioned with respect to the axis of rotation of the screen support frame 25. The position of the ink feeding mechanisms 116, 118 with respect to the horizontal can be regulated through the adjustable bolt 122. By turning the bolt 122, it is possible to pivot the entire ink feeding mechanism about the pivotal shaft 120. The bolt can then be locked in place by means of the locking nuts 123. Furthermore, laterally shiftable adjustment can be attained through releasing of the bolt 129 and shifting the tenon 128 within the mortise 127 to the desired position. Rotational positioning can be achieved through pivoting the mounting plate 130, 131 about the pivot pin 132'. After the desired rotational position has been attained, the adjustable bolt 133 can then be tightened through the nut 134'. The degree of forward positioning of the feed aperture 183 with respect to the electrostatic printing screens can also be attained by adjusting the locking nuts 142 on the rod 141. Additionally, the position of the exhaust tube 185 on the ink feed nozzle 182 can also be adjusted by means of the clamp 187 for the degree of air pressure which is to be maintained in the ink delivery tube 174. Similarly, the air gap 179 in the ink transfer zone is also adjusted by means of the bolt 181 for the desired air pressure to be maintained in the delivery tube 174.

Upon energization of the electric motor 10, the drive belt 11 will rotate the pulley 9 and hence operate the drive shaft 8. Rotation of the transversely extending drive shaft 8 will rotate the driving pinion gear 55 which will, in turn, rotate the driven pinion gear 56 and the primary Geneva shaft 53. The actuation of the secondary Geneva mechanism 64 will cause the turret 74 to rotate in the manner to be hereinafter described in more detail. As the turret 74 rotates, it will shift the first mandrel 100 in a counter-clockwise direction until it stops at the container dispensing mechanism 189. As the mandrel 100 is shifted into horizontal alignment with the discharge tube 194, the solenoid 207 will be energized responsive to an electrical signal from the control circuit (not shown). The plunger 208, forming part of the solenoid 207, will shift the two retaining frames 196, 197 upwardly. As the frame 196 is shifted to its upper position, reference being made to FIGURE 15, the legs 200 will be shifted out of engagement with the first container C in the stack of containers. The air which passed around the containers in the large areas between the flutes 192 in the retaining section will cause the first container C in the stack to eject. However, as both of the frames 196, 197 are shifted upwardly, the enlarged flanges 213 on the shoes 212 will engage the next container C. Therefore, the entire stack of containers will be held against the action of the air forced into the housing 190. When the solenoid 207 is thereafter de-energized, both of the frames 196, 197 will be shifted downwardly causing the flanges 213 on the shoes 212 to be removed from engagement with the first container C which was previously the second container C in the stack. However as the retaining frame 197 shifts downwardly, the frame 196 will also shift downwardly. Consequently, the entire stack of containers will be moved forwardly due to the action of the air admitted to the housing 190. The first container C in the stack will then strike the walls of the legs 200.

When a container C is forced onto the mandrel 100, the valve drum 79 will be in the position as indicated in FIGURE 5. In other words, all of the radial fluid ducts 93, which lead to the mandrel shaft 77 and mandrels 100 will be in communication with the air passage 88 and, therefore, maintained under vacuum. Thus, the vacuum is imposed upon the extended end 110 of the shaft 77 and urges the container C onto the mandrel 100. Moreover, the fingers 112 will engage the bottom wall of the container C preventing collapsing of the bottom wall.

Continued rotation of the transversely extending drive shaft 8 will rotate the pinion gear 55, which, in turn, rotates the pinion gear 56 and the primary Geneva shaft 53, as indicated above. Thus, the primary Geneva shaft 53 is continuously rotated with the drive shaft 8. The rotation of the primary Geneva shaft 53 will cause the pin wheel 59 to rotate in a counter-clockwise direction, reference being made to FIGURE 10. However, the primary Geneva shaft 53 will rotate in a clockwise direction. As this occurs, the annular side wall of the pin wheel 59 will be slightly spaced from the concave guide surfaces 69 in one quadrant. Inasmuch as the guide surface 69 has the same radius of curvature as the annular surface of the pin wheel 59, the secondary Geneva mechanism 64 and the slot wheel 65 does not rotate on the main shaft 8. The continued rotation of the pin wheel will cause the outwardly extending pin 61 to engage a slot 68 in the next adjacent crown 66. The engagement of the pin 61 in this slot 68 is more fully shown in FIGURE 6. Continued rotation of the pin wheel 59 will cause the slot wheel 65 to rotate in a counter-clockwise direction, reference being made to FIGURES 6 and 10, until the position shown in FIGURE 9 is attained. In this position, the turret 74 will have rotated a full 45°. Further rotation of the pin wheel 59 will continue to rotate the slot wheel 65 until the pin 61 again reaches the position as shown in FIGURE 10. It can thus be seen that as the pin wheel 69 rotates for 360° it thereby rotates the slot-wheel 65 and the secondary Geneva mechanism 64 for a full 90° turn. During the first 270° rotation of the pin wheel 59, the slot-wheel remains stationary and the slot-wheel turns the full 90° during the last 90° rotation of the pin wheel 59.

Thus, it can be seen that the primary Geneva shaft 53 is continually rotating in a clockwise direction, reference being made to FIGURE 10, and continually rotates the pin wheel 59 in a clockwise direction. However while the main drive shaft 8 is continually rotating in a counter-clockwise direction, the secondary Geneva mechanism 64 will only rotate during the last 90° turn of the pin wheel 59. This 90° rotation advances the mandrel which was originally positioned at the loading station $S_1$ to the first printing station or second work station $S_2$. It can be observed that during the time that the turret 74 has rotated 90° in a counter-clockwise direction, the radial fluid duct 93 remains in fluid communication with the primary air passage 88 and, therefore, the mandrel 100 was maintained under a vacuum.

During the portion of the time that the turret 74 is rotating in a counter-clockwise direction and shifting the mandrel 100 from the first work station $S_1$ to the second work station $S_2$, the roller 165 on the arm 163 will be in engagement with the camming ridge 166, thereby urging the ink feeding mechanism 118 rearwardly. However as the mandrel 100 approaches the first printing station or second work station $S_2$, the camming ridge 166 recedes permitting the ink feeding mechanism 118 to be biased forwardly by means of the compression spring 140. When the mandrel 100 reaches the first printing station $S_2$, the pin 61 will be located at the position as shown in FIGURE 10, where it is just being removed from engagement with the slot 68. The continued rotation of the pin wheel 59 will not affect the secondary Geneva mechanism 64 and the mandrel 100 will be temporarily positioned at the second work station $S_2$.

The continued rotation of the drive shaft 8 will, however, rotate each of the screen support frames 25, 43 in the manner previously described. Moreover, each of the screen support frames 25, 43 will rotate in a clockwise direction, reference being made to FIGURE 3 so that tangential approach and departure between the electrostatic printing screens 31, 48 and the mandrel 100 is maintained. It should also be understood that the various bevel gears employed in the apparatus A for rotating the screen support frames 25, 43 were sized so that these frames 25, 43 rotate at the same peripheral speed as the rotation of the mandrel 100. Furthermore, it can be seen that the roller wheel 114 resides in contact with the friction wheel 99, the latter being driven through the main drive shaft 8. Accordingly, the roller wheel 114 is sized so that it also provides the proper peripheral speed for the mandrel 100. In this manner, the tangential contact and approach between the mandrel 100 and the electrostatic printing screens 31, 48 is maintained. Furthermore, the ink feeding mechanisms 116, 118 are positioned so that the ink feeding nozzle 182 is positioned at this tangential line of closest approach. Consequently, the ink will be delivered to the screens at the tangential line of closest approach where the ink particles are then captured in the electrostatic field.

The electroscopic ink particles maintained in the chamber 144 are continuously levitated or retained in a fluidized state by the agitator 153. As the distributor roller 169 rotates, it will collect the ink particles along the discharge slot 149 and carry the ink particles in the interstices of the fabric 173. The ink will then be removed from the fabric 173 by the air passing the air gap 179 in the delivery tube 174. This air will carry the ink particles through the charging chamber where they are continually bombarded against the metal plate and triboelectrically charged. Furthermore, they may be ionized by means of corona discharge wires, as desired. The electroscopic ink particles are then reduced to practically a zero velocity at the electrostatic printing screens 31, 48 where they are then propelled through the screens 31, 48 to the container C by means of the electrostatic field. It is to be understood that the ink particles will pass through the open mesh portions of the electrostatic printing screen and not through the closed portions of the electrostatic printing screen. In this manner, they will project the image on the electrostatic printing screen to the container C.

As the screen support frame 43 continues to rotate, the roller 165 will again engage the camming ridge 166 moving the ink feeding mechanism 116 rearwardly. After the electrostatic printing has been performed at the first printing station $S_2$, the pin 61 has then approximately rotated 270° to the next slot 68. As the pin 61 engages the slot 68, it will rotate the secondary Geneva mechanism 64 through another 90° arc in a counter-clockwise direction, in the manner as previously described. As this occurs, the mandrel 100, which was positioned at the station $S_2$, is then shifted to the second printing station or third work station $S_3$.

When the mandrel 100 is located at the second printing station $S_3$, it will also be rotated in the manner as shown in FIGURE 3. Similarly, the screen support frame 25 is rotated in a clockwise direction so that tangential departure and approach is maintained between the mandrel 100 and the electrostatic printing screens 31. Again, the ink feeding mechanism 116 is so positioned so that ink will pass through the screen 31 along the elemental line of closest approach. Furthermore, it should be recognized that the images on the electrostatic printing screen 31 are similar to the images on the electrostatic printing screen 48 and moreover, are so positioned so that images from each of the screens will be marginally aligned for multicolor printing. It should also be recognized that if it is desired to perform only single color printing or print no other design at all on the container C, the electrostatic printing screen support frame 25 can be disconnected and removed from the printing operation. The printing which takes place at the work station $S_3$ is substantially similar to the printing which takes place at the work station $S_2$ and is, therefore, not described in further detail herein.

At this point, the pin 61 has again rotated 270° and is positioned at the next slot 68. Continued rotation of the pin 61 through the remaining 90° will again rotate the secondary Geneva mechanism 64 so that the mandrel 100 is located at the fourth work station or fixing station. In this case, the mandrel 100 with the container C disposed thereon is passed through the vapor phase of the solvent and the electrostatic printing image is fixed in the manner as previously described. The continued rotation of the turret 74 will move the mandrel 100 with the container C thereon out of the fixing tank 216, where the container is permitted to air dry thereby removing all of the solvent from a hardened ink. At this point, the images which were projected onto the container C have been hardened to a substantially permanent image.

The continued rotation of the pin wheel 59 and the secondary Geneva mechanism 64 will cause the mandrel 100 to pass into the fifth work station or discharge station $S_5$ in the area of the discharge funnel 214. By reference to FIGURE 5, it can be seen that as the turret continues to rotate, the valve drum 79 will also rotate causing the radial fluid duct 93 to communicate with the secondary air passage 95. As this occurs, air will pass from the secondary air passage 95, through the radial duct 93 and into the axial duct 94. The air will then be conducted through the hollow mandrel shaft 77 and to the mandrel 100. The air projected from the mandrel 100 will cause the container C to be ejected from the mandrel 100 and into the discharge funnel 214. As the container is ejected into the funnel 214, it is carried away through the discharge tube 215, since the latter is maintained under a vacuum. However, it should be recognized that there is a lag in the time that the container C leaves the fixing tank 216 and before it is ejected from the mandrel 100 due to the passage of air through the various ducts previously described. This air-lag time is sufficient to permit the container C to air dry before it is ejected from the mandrel. Moreover, the funnel 214 is sufficiently large to account for this air lag.

The continued rotation of the secondary Geneva mechanism 64 will cause the turret 74 to rotate until the mandrel 100 is again positioned at the loading station or first work station $S_1$. However, it can be recognized that during the time that one of the mandrels 100 progressed through each of the five work stations the other three mandrels on the turret 74 also progressed through the same five work stations in similar manner. Thus after the mandrel 100 is again positioned at the container dispensing mechanism 189, a new cycle can then be initiated in the manner as described.

It should be uderstood that changes and modifications may be made in the form, construction, arrangement and combination of parts presently described and pointed out without departing from the nature and principle of our invention.

Having thus described our invention, what we desire to claim and secure by Letters Patent is:

1. An electrostatic printing apparatus comprising:
   (a) base means,
   (b) a rotatable screen frame operatively mounted on said base means and having at least one individual electrostatic printing screen associated therewith,
   (c) a first continuously rotatable shaft operatively mounted on said base means,
   (d) an actuating wheel operatively mounted on said shaft and rotating through continuous 360° revolutions,
   (e) a second shaft operatively disposed in spaced relation to said first shaft,
   (f) a slot-wheel having a plurality of engageable slots operatively mounted on said second shaft and being intermittently rotatable,
   (g) an extended pin on said actuating wheel for engaging any of said slots on said slot-wheel and rotating the slot-wheel through arcs of selected length during arcuate rotational movements of said actuating wheel through said selected length,
   (h) a turret operatively connected to said slot-wheel and being rotatable therewith so that said turret is moved to successive positions which are spaced apart the arcuate distance of said selected length,
   (i) a plurality of article retaining means mounted on said turrent and being sized to retain desired articles for printing,
   (j) means for feeding a supply of electroscopic ink to said screens when said article retaining means are aligned with said screens,
   (k) means for moving said rotatable screen frame in pretimed relationship to said turret so that each one of said article retaining means becomes aligned with one of said screens,
   (l) and means for creating an electrostatic field between said screens and article retaining means so that ink will pass through the open portions of the screen to the article retaining means.

2. An electrostatic printing apparatus comprising:
   (a) base means,
   (b) a rotatable screen frame operatively mounted on said base means and having at least one individual electrostatic printing screen associated therewith,
   (c) a first continuously rotatable shaft operatively mounted on said base means,
   (d) an actuating wheel operatively mounted on said shaft and rotating through continuous 360° revolutions,
   (e) a second shaft operatively disposed in spaced relation to said first shaft,
   (f) a slot-wheel having a plurality of engageable slots operatively mounted and said second shaft and being intermittently rotatable,
   (g) a web-wheel operatively connected to said slot-wheel and being rotatable therewith,
      said web-wheel having a plurality of enlarged radially spaced recesses,
   (h) an enlarged lobe on said actuating wheel and being sized to extend into any of the recesses of said web-wheel,
   (i) an extended pin on the lob of said actuating wheel for engaging any of said slots on said slot-wheel and rotating the slot-wheel through 90° arcs during 90° arcuate rotational movements of said actuating wheel,
   (j) a turret operatively connected to said slot-wheel and being rotatable therewith so that said turret is moved to successive positions which are spaced 90° apart, (k) a plurality of article retaining means mounted on said turret and being sized to retain desired articles for printing, (l) means for feeding a supply of electroscopic ink to said screens when said article retaining means are aligned with said screens, (m) means for moving said rotatable screen frame in pretimed relationship to said turret so that each one of said article retaining means becomes aligned with one of said screens, (n) and means for creating an electrostatic field between said screens and article retaining means so that ink will pass through the open portions of the screen to the article retaining means.

3. An electrostatic printing apparatus comprising:
(a) base means,
(b) a first continuously rotatable screen frame operatively mounted on said base means and having at least one first individual electrostatic printing screen associated therewith,
(c) a second continuously rotatable screen frame operatively mounted on said base means and having at least one second individual electrostatic printing screen associated therewith,
(d) an intermittently rotatable turret operatively mounted on said base means,
(e) a plurality of article retaining means mounted on said turret and being sized to retain desired articles for printing,
(f) means for feeding a supply of electroscopic ink to each of said screens when said article retaining means are aligned with said screens,
(g) means for rotating said turret so that an article retaining means is shifted to a screen on said first screen frame and then a screen on said second screen frame,
(h) means for rotating each of said movable screen frames in pretimed relationship to said turret so that each one of said article retaining means becomes aligned with one of said screens on each of said screen frames,
(i) and means for creating an electrostatic field between said screens and article retaining means so that ink will pass through the open portions of the screens to the article retaining means.

4. An electrostatic printing apparatus comprising:
(a) base means,
(b) a turret operatively mounted on said base means,
(c) a plurality of article retaining means operatively mounted on said base means,
(d) means for intermittently rotating said turret so that each of said article retaining means passes five work stations,
(e) article dispensing means at said first station for depositing an article on an article retaining means as each of said article retaining means passes the first work station,
(f) first printing means including a first continuously rotatable screen frame at said second work station for electrostatically printing an image on said article,
(g) second printing means including a second continuously rotatable screen frame at said third work station for electrostatically printing an image on said article,
(h) electroscopic ink fixing means at said fourth work station for hardening the images on said article,
(i) and means at said fifth work station for withdrawing the article from the article retaining means.

5. The electrostatic printing apparatus of claim 4 wherein the first and second printing means are pretimed so that the images from said first and second printing means may be overlapping and formed with different colored inks.

6. The electrostatic printing apparatus of claim 4 wherein the apparatus is provided with means for driving the turret so that the turret stops for a predetermined time at said first, second, third and fourth work stations.

7. An electrostatic printing apparatus comprising:
(a) base means,
(b) a movable screen frame operatively mounted on said base means and having a plurality of individual electrostatic printing screens associated therewith,
(c) an intermittently rotatable turret operatively mounted on said base means,
(d) a plurality of article retaining means mounted on said turret and being sized to retain desired articles for printing,
(e) means for rotating said turret and moving said movable screen in pretimed relationship so that each one of said article retaining means is shifted to a printing position for alignment with one of said screens,
(f) ink feeding means operatively associated with said screen frame for feeding a supply of electroscopic ink to said screen when said article retaining means are aligned with said screens,
(g) means for normally biasing said ink feeding means toward said screen frame when a screen is moved to the printing position,
(h) means on said screen frame for shifting said ink feeding means away from said screen frame when none of the screens on said screen frame are in printing position,
(i) and means for creating an electrostatic field between said screens and article retaining means so that ink will pass through the open portions of the screen to the article retaining means.

8. An electrostatic printing apparatus comprising:
(a) base means,
(b) a first continuously rotatable screen frame operatively mounted on said base means and having a plurality of first individual electrostatic printing printing screens associated therewith,
(c) a second continuously rotatable screen frame operatively mounted on said base means and having a plurality of second individual electrostatic printing screens associated therewith,
(d) an intermittently rotatable turret operatively mounted on said base means,
(e) a plurality of article retaining means mounted on said turret and being sized to retain desired articles for printing,
(f) a separate ink feeding mechanism operatively associated with each of said screen frames for feeding a supply of electroscopic ink to each of said screens when said article retaining means are aligned with said screens,
(g) means for rotating said turret so that each one of said article retaining means is shifted to a printing position for alignment with one of said screens on said first screen frame,
(h) said last named means shifting said turret so that each one of said article retaining means is shifted to a printing position for alignment with one of said screens on said second screen frame,
(i) means for rotatng each of said movable screen frames in pretimed relationship to said turret so that each one of said article retaining means becomes aligned with one of said screens on each of said screen frames,
(j) means for shifting each of said ink feeding mechanisms toward said screen frames when the screens thereon are moved to the printing position,
(k) means for shifting each of said ink feeding mechanisms away from said screen frames when none of the screens on said screen frames are in printing position,
(l) and means for creating an electrostatic field between said screens and article retaining means so that ink will pass through the open portions of the screens to the article retaining means.

9. An electrostatic printing apparatus comprising:
(a) base means,
(b) a movable screen frame operatively mounted on said base means and having a plurality of individual electrostatic printing screens associated therewith,
(c) an intermittently rotatable turret operatively mounted on said base means,
(d) a plurality of article retaining means mounted on said turret and being sized to retain desired articles for printing,
(e) means for rotating said turret and moving said movable screen in pretimed relationship so that each one of said article retaining means is shifted to a printing position for alignment with one of said screens,
(f) means associated with said last named means for rotating said article retaining means when in alignment with said screen,
(g) ink feeding means operatively associated with said screen frame for feeding a supply of electroscopic ink to said screen when said article retaining means are aligned with said screens,
(h) means for normally biasing said ink feeding means toward said screen frame when a screen is moved to the printing position,
(i) means on said screen frame for shifting said ink feeding means away from said screen frame when none of the screens on said screen frame are in printing position,
(j) and means for creating an electrostatic field between said screens and article retaining means so that ink will pass through the open portions of the screen to the article retaining means.

10. An electrostatic printing apparatus comprising:
(a) base means,
(b) a first continuously rotatable screen frame operatively mounted on said base means and having at least one first individual electrostatic printing screen associated therewith, said first screen frame being rotatable about a first axis,
(c) a second continuously rotatable screen frame operatively mounted on said base means and having at least one second individual electrostatic printing screen associated therewith, said second screen frame being continuously rotatable about a second axis,
(d) an intermittently rotatable turret operatively mounted on said base means,
(e) a plurality of article retaining means mounted on said turret and being sized to retain desired articles for printing,
(f) means for feeding a supply of electroscopic ink to each of said screens when said article retaining means are aligned with said screens,
(g) means for rotating said turret so that an article retaining means is shifted to a screen on said first screen frame and then a screen on said second screen frame,
(h) means for rotating each of said movable screen frames in pretimed relationship to said turret so that each one of said article retaining means becomes aligned with one of said screens on each of said screen frames,
(i) means for rotating each of said article retaining means about a third axis during the actual transfer of electroscopic ink through said electrostatic printing screens so that the entire surface of the article to be printed approaches, and moves away from the screen, said third axis of rotation being substantially perpendicular in space to said first and second axis of rotation, said screens moving tangentially past the surface of the article as each of said screen frames rotate about their axis during the printing operation, (j) and means for creating an electrostatic field between said screens and article retaining means so that ink will pass through the open portions of the screens to the article retaining means.

11. An electrostatic printing apparatus comprising:
(a) base means,
(b) a first continuously rotatable screen frame operatively mounted on said base means and having a plurality of first individual electrostatic printing screens associated therewith,
(c) a second continuously rotatable screen frame operatively mounted on said base means and having a plurality of second individual electrostatic printing screens associated therewith,
(d) an intermittently rotatable turret operatively mounted on said base means,
(e) a plurality of article retaining means mounted on said turret and being sized to retain desired articles for printing,
(f) means for feeding a supply of electroscopic ink to each of said screens when said article retaining means are aligned with said screens,
(g) means for rotating said turret so that an article retaining means is shifted to a screen on said first screen frame and then a screen on said second screen frame,
(h) means for rotating each of said movable screen frames in pretimed relationship to said turret so that each one of said article retaining means becomes aligned with one of said screens on each of said screen frames,
(i) and means for creating an electrostatic field between said screens and article retaining means so that ink will pass through the open portions of the screens to the article retaining means.

12. An electrostatic printing apparatus comprising:
(a) base means,
(b) a first continuously rotatable screen frame operatively mounted on said base means and having at least one first individual electrostatic printing screen associated therewith, said first screen frame being rotatable about a first axis,
(c) a second continuously rotatable screen frame operatively mounted on said base means and having at least one second individual electrostatic printing screen associated therewith, said second screen frame being continuously rotatable about a second axis,
(d) an intermittently rotatable turret operatively mounted on said base means,
(e) a plurality of article retaining means mounted on said turret and being sized to retain desired articles for printing,
(f) means for feeding a supply of electroscopic ink to each of said screens when said article retaining means are aligned with said screens,
(g) means for rotating said turret so that an article retaining means is shifted to a screen on said first screen frame and then a screen on said second screen frame,
(h) means for rotating each of said movable screen frames in pretimed relationship to said turret so that each one of said article retaining means becomes aligned with one of said screens on each of said screen frames,
(i) means for rotating each of said article retaining means about a third axis during the actual passage of ink through said electrostatic printing screens so that the entire surface of the article to be printed approaches and moves away from the screen,
   (1) said third axis of rotation being substantially perpendicular in space to said first and second axis of rotation,
   (2) said screens moving tangentially past the surface of the article as each of said screen frames rotate about their axis during the printing operation, (3) said first and second screen frames being located on said base means so that the article retaining means meets the screen on said screen frame at the periphery of an arc through which article retaining means passes,
(j) and means for creating an electrostatic field between said screens and article retaining means so that ink will pass through the open portions of the screens to the article retaining means.

13. An electrostatic printing apparatus comprising:
(a) base means,
(b) a first continuously rotatable screen frame operatively mounted on said base means and having at least one first individual electrostatic printing screen associated therewith, said first screen frame being rotatable about a first axis,
(c) a second continuously rotatable screen frame operatively mounted on said base means and having at least one second individual electrostatic printing screen associated therewith, said second screen frame being continuously rotatable about a second axis,
(d) an intermittently rotatable turret operatively mounted on said base means,
(e) a plurality of article retaining means mounted on said turret and being sized to retain desired articles for printing,
(f) means for feeding a supply of electroscopic ink to each of said screens when said article retaining means are aligned with said screens,
(g) means for rotating said turret so that an article retaining means is shifted to a screen on said first screen frame and then a screen on said second screen frame,
(h) means for rotating each of said movable screen frames in pretimed relationship to said turret so that each one of said article retaining means becomes aligned with one of said screens on each of said screen frames,
(i) means for rotating each of said article retaining means about a third axis during the actual passage of ink through said electrostatic printing screens so that the entire surface of the article to be printed approaches and moves away from the screen,
 (1) said third axis of rotation being substantially perpendicular in space to said first and second axis of rotation,
 (2) said screens moving tangentially past the surface of the article as each of said screen frames rotate about their axis during the printing operation,
 (3) said first and second screen frames being located on said base means so that the article retaining means meets the screen on said screen frame at the periphery of an arc through which article retaining means passes,
(j) means for creating an electrostatic field between said screens and article retaining means so that ink will pass through the open portions of the screens to the article retaining means,
(k) and an ink fixing tank operatively mounted on said base means and having a bottom wall which matches the arc through which said article retaining means passes.

14. An electrostatic printing apparatus comprising:
(a) base means,
(b) a first continuously rotatable screen frame operatively mounted on said base means and having at least one first individual electrostatic printing screen associated therewith, said first screen frame being rotatable about a first axis,
(c) a second continuously rotatable screen frame operatively mounted on said base means and having at least one second individual electrostatic printing screen associated therewith, said second screen frame being continuously rotatable about a second axis,
(d) an intermittently rotatable turret operatively mounted on said base means,
(e) a plurality of article retaining means mounted on said turret and being sized to retain desired articles for printing,
(f) means for feeding a supply of electroscopic ink to each of said screens when said article retaining means are aligned with said screens,
(g) means for rotating said turret so that an article retaining means is shifted to a screen on said first screen frame and then a screen on said second screen frame,
(h) means for rotating each of said movable screen frames in pretimed relationship to said turret so that each one of said article retaining means becomes aligned with one of said screens on each of said screen frames,
(i) means for rotating each of said article retaining means about a third axis during the actual passage of ink through said electrostatic printing screens so that the entire surface of the article to be printed approaches, and moves away from the screen,
 (1) said third axis of rotation being substantially perpendicular in space to said first and second axis of rotation,
 (2) said screens moving tangentially past the surface of the article as each of said screen frames rotate about their axis during the printing operation,
 (3) said first and second screen frames being located on said base means so that the article retaining means meets the screen on said screen frame at the periphery of an arc through which article retaining means passes,
(j) means for creating an electrostatic field between said screens and article retaining means so that ink will pass through the open portions of the screens to the article retaining means,
(k) and an article discharge funnel operatively mounted on said base means and having an arcuate opening which matches the arc through which said article retaining means passes.

15. An electrostatic printing apparatus comprising:
(a) base means,
(b) a turret operatively mounted on said base means,
(c) a plurality of article retaining means operatively mounted on said base means,
(d) means for intermittently rotating said turret so that each of said article retaining means passes four work stations and moves through a 360° circumferential path during a complete printing cycle,
(e) article dispensing means at said first station for depositing an article on an article retaining means as each of said article retaining means passes the first work station,
(f) printing means including a continuously rotatable screen frame at said second work station for electrostatically printing an image on said article,
(g) an electrostatic printing screen on said screen frame, said screen moving in said path through an arc which is opposite in direction to the circumferential path,
(h) electroscopic ink fixing means at said third work station for hardening the image on said article, said ink fixing means having an arcuate wall which conforms to the circumferential path for accommodating said article retaining means,
(i) and means at said fourth work station for withdrawing the article from the article retaining means, said last named means having an arcuate wall forming an inlet aperture which matches said circumferential path.

16. An electrostatic printing apparatus comprising:
(a) base means, (b) a turret operatively mounted on said base means,
(c) a plurality of article retaining means operatively mounted on said base means,
(d) means for intermittently rotating said turret so that each of said article retaining means passes five work stations and moves through a 360° circumferential path during a complete printing cycle,
(e) article dispensing means at said first station for depositing an article on an article retaining means as each of said article retaining means passes the first work station,
(f) first printing means including a first continuously rotatable screen frame at said second work station for electrostatically printing an image on said article,
(g) a first electrostatic printing screen on said screen frame, said screen moving in said path through an arc which is opposite in direction to the circumferential path,
(h) second printing means including a second continuously rotatable screen frame at said third work station for electrostatically printing an image on said article,
(i) a second electrostatic printing screen on said screen frame, said screen moving in said path through an arc which is opposite in direction to the circumferential path,
(j) electroscopic ink fixing means at said fourth work station for hardening the images on said article, said ink fixing means having an arcuate wall which conforms to the circumferential path for accommodating said article retaining means,
(k) and means at said fifth work station for withdrawing the article from the article retaining means, said last named means having an arcuate wall forming an inlet aperture which matches said circumferential path.

17. An electrostatic printing apparatus comprising:
(a) base means,
(b) a turret operatively mounted on said base means,
(c) a plurality of article retaining means operatively mounted on said base means,
(d) driving means for intermittently rotating said turret so that each of said articles retaining means passes five work stations,
(e) article dispensing means at said first station for depositing an article on an article retaining means as each of said article retaining means passes the first work station,
(f) first printing means at said second work station for electrostatically printing an image on said article,
(g) second printing means at said third work station for electrostatically printing an image on said article,
(h) electroscopic ink fixing means at said fourth work station for hardening the images on said article,
(i) means at said fifth work station for withdrawing the article from the article retaining means,
(j) and means operatively associated with said driving means for driving the turret so that the turret stops for a predetermined time at said first, second, third and fourth work stations and where the article retaining means continually move through the fifth work station.

18. An electrostatic printing apparatus comprising:
(a) base means,
(b) a rotatable screen frame operatively mounted on said base means and having at least one individual electrostatic printing screen associated therewith,
(c) a first continuously rotatable shaft operatively mounted on said base means,
(d) an actuating wheel operatively mounted on said first shaft and rotating through continuous 360° revolutions,
(e) a second continuously rotatable shaft operatively mounted on said base means and being disposed in spaced relation to said first shaft,
(f) a slot-wheel operatively mounted in freewheeling relationship on said second shaft and being intermittently rotatable,
(g) a web-wheel operatively connected to said slot-wheel and being rotatable therewith, said web-wheel having a plurality of enlarged radially spaced recesses,
(h) an enlarged lobe on said actuating wheel and being sized to extend into any of the slots of said web-wheel,
  (1) said slot-wheel having a plurality of radially spaced crown portions separated by arcuate recesses and where each of the recesses has the same radius of curvature of said actuating wheel,
  (2) said slot-wheel also having an elongated slot in each of said crown portions,
(i) an extended pin on the lobe of said actuating wheel for engaging any of said slots on said slot-wheel and rotating the slot-wheel through 90° arcs during 90° arcuate rotational movements of said actuating wheel,
(j) a turret operatively connected to said slot-wheel and being rotatable therewith so that said turret is moved to successive positions which are spaced 90° apart,
(k) a plurality of article retaining means mounted on said turret and being sized to retain desired articles for printing,
(l) means for feeding a supply of electroscopic ink to said screens when said article retaining means are aligned with said screens,
(m) means for moving said rotatable screen frame in pretimed relationship to said turret so that each one of said article retaining means becomes aligned with one of said screens,
(n) and means for creating an electrostatic field between said screens and article retaining means so that ink will pass through the open portions of the screen to the article retaining means.

19. An electrostatic printing apparatus comprising:
(a) base means,
(b) a rotatable screen frame operatively mounted on said base means and having at least one individual electrostatic printing screen associated therewith,
(c) a first continuously rotatable shaft operatively mounted on said base means,
(d) actuating means mounted on said shaft and rotating through continuous 360° revolutions,
(e) a second shaft operatively mounted on said base means and being disposed in spaced relation to said first shaft,
(f) an actuable means operatively mounted on said second shaft and being intermittently rotatable,
(g) engageable means on said actuating means for engaging said actuable means,
(h) a turret operatively connected to said actuatable means and being intermittently rotatable therewith to a series of successive positions,
(i) a valve drum operatively connected to said actuatable means and being rotatable therewith,
(j) a valve manifold stationarily mounted with respect to said valve drum and being circumferentially disposed therearound in fluid cooperative relationship with said valve drum,
  (1) said valve drum having a plurality of radial ducts each of which communicates with an axial duct,
  (2) said axial ducts passing through said valve drum and actuable means and turret,
  (3) said radial ducts being moved between a plurality of fluid passages in said valve manifold as said valve drum rotates so that various fluid pressure relationships are transmitted through said axial ducts as said valve drum rotates, (k) a plurality of article retaining means mounted on said turret and being sized to retain desired articles for printing, (l) a fluid line in each article retaining means communicating with said radial fluid ducts in said valve drum, (m) means for feeding a supply of electroscopic ink to said screens when said article retaining means are aligned with said screen, (n) means for moving said rotatable screen frame in pretimed relationship to said turret so that each one of said article retaining means becomes aligned with one of said screens, (o) and means for creating an electrostatic field between said screens and article retaining means so that ink will pass through the open portions of the screen to the article retaining means.

20. The method of electrostatically printing on articles which comprises:

(a) moving a movable mandrel in a circular path through a plane to a first work position, (b) stopping the circular movement of said mandrel at said first work position, (c) disposing an article to be printed on the movable mandrel sized to retain the article at said first work position, (d) moving the mandrel in said circular path to a second work position for positioning the article in relation to a first electrostatic printing screen, (e) stopping the movement of said mandrel in said circular path at the second work position, (f) creating an electrostatic field between the article and screen so electroscopic ink will pass through the screen to the article and imprint an image thereon, (g) moving the mandrel in said circular path to a third work position for positioning the article in relation to a second electrostatic printing screen, (h) stopping the movement of said mandrel in said circular path at said third work position, (i) creating an electrostatic field between the article and second screen so electroscopic ink will pass through said second screen to the article and imprint an image thereon, (j) moving said mandrel in said circular path to a fourth work position and stopping the movement of said mandrel at said fourth work position, (l) moving said mandrel past a discharge chute at a fifth work position without stopping the movement of said mandrel at the fifth work position, (m) and ejecting the article from the mandrel at the fifth work position.

21. The method of electrostatically printing on articles which comprises:

(a) moving a movable mandrel in a circular path through a plane to a first work position, (b) stopping the circular movement of said mandrel at said first work position, (c) disposing an article to be printed on the movable mandrel sized to retain the article at said first work position, (d) moving the mandrel in said circular path to a second work position for positioning the article in relation to a first electrostatic printing screen, (e) stopping the movement of said mandrel in said circular path at the second work position, (f) creating an electrostatic field between the article and screen so electroscopic ink will pass through the screen to the article and imprint an image thereon, (g) moving said first electrostatic printing screen past the article during the passage of ink therethrough so that the screen tangentially passes the surface of the article to be printed, (h) moving the mandrel in said circular path to a third work position for positioning the article in relation to a second electrostatic printing screen, (i) stopping the movement of said mandrel in said circular path at said third work position, (j) creating an electrostatic field between the article and second screen so electroscopic ink will pass through said second screen to the article and imprint an image thereon, (k) moving said second electrostatic printing screen past the article during the passage of ink therethrough so that the screen tangentially passes the surface of the article to be printed, (l) moving said mandrel in said circular path to a fourth work position and stopping the movement of said mandrel at said fourth work position, (m) introducing the article into a fixing media at said fourth work position to harden the images thereon, (n) moving said mandrel past a discharge chute at a fifth work position without stopping the movement of said mandrel at the fifth work position, (o) and ejecting the article from the mandrel at the fifth work position.

22. The method of electrostatically printing on articles which comprises:

(a) moving a movable mandrel in a circular path through a plane to a first work position, (b) stopping the circular movement of said mandrel at said first work position, (c) disposing an article to be printed on the movable mandrel sized to retain the article at said first work position, (d) moving the mandrel in said circular path to a second work position for positioning the article in relation to a first electrostatic printing screen, (e) stopping the movement of said mandrel in said circular path at the second work position, (f) creating an electrostatic field between the article and screen so electroscopic ink will pass through the screen to the article and imprint an image thereon, (g) rotating said mandrel during the movement of said screen so that the surface of the article to be printed tangentially approaches, forms a line of elemental closest approach and departs from the screen, (h) moving said first electrostatic printing screen past the article during the passage of ink therethrough so that the screen tangentially passes the surface of the article to be printed, (i) moving the mandrel in said circular path to a third work position for positioning the article in relation to a second electrostatic printing screen, (j) stopping movement of said mandrel in said circular path at said third work position, (k) creating an electrostatic field between the article and second screen so electroscopic ink will pass through said second screen to the article and imprint an image thereon, (l) rotating said mandrel during the movement of said screen so that the surface of the article to be printed tangentially approaches, forms a line of elemental closest approach and departs from the screen, (m) moving said second electrostatic printing screen past the article during the passage of ink therethrough so that the screen tangentially passes the surface of the article to be printed, (n) moving said mandrel in said circular path to a fourth work position and stopping the movement of said mandrel at said fourth work position, (o) introducing the article into a fixing media at said fourth work position to harden the images thereon, (p) moving said mandrel past a discharge chute at a fifth work position without stopping the movement of sand mandrel at the fifth work position, (q) and ejecting the article from the mandrel at the fifth work position.

23. The method of electrostatically multicolor printing on articles which comprises:
 (a) moving a movable mandrel in a circular path through a plane to a first work position,
 (b) stopping the circular movement of said mandrel at said first work position,
 (c) disposing an article to be printed on the movable mandrel sized to retain the article at said first work position,
 (d) moving the mandrel in said circular path to a second work position for positioning the article in relation to a first electrostatic printing screen,
 (e) stopping the movement of said mandrel in said circular path at the second work position,
 (f) creating an electrostatic field between the article and screen so electroscopic ink will pass through the screen to the article and imprint an image thereon,
 (g) moving the mandrel in said path to a third work position for positioning the article in relation to a second electrostatic printing screen,
 (h) stopping the movement of said mandrel in said circular path at said third work position,
 (i) creating an electrostatic field between the article and second screen so electroscopic ink of a different color will pass through said second screen to the article and imprint an image thereon,
 (j) timing the movement of said first and second printing screens to align the image from said first and second printing screens,
 (k) moving said mandrel in said circular path to a fourth work position and stopping the movement of said mandrel at said fourth work position,
 (l) introducing the article into a fixing media at said fourth work position to harden the images thereon,
 (m) moving said mandrel past a discharge chute at a fifth work position without stopping the movement of said mandrel at the fifth work position,
 (n) and ejecting the article from the mandrel at the fifth work position.

24. An electrostatic printing apparatus comprising:
 (a) base means,
 (b) an intermittently rotatable turret operatively mounted on said base means,
 (c) a substantially planar screen frame operatively mounted on said base means and continuously rotatable about an axis parallel to the axis of said turret, said screen frame having a plurality of individual circumferentially spaced planar electrostatic printing screens associated therewith,
 (d) a plurality of article retaining means mounted on said turret and being sized to retain desired articles for printing,
 (e) means for feeding a supply of electroscopic ink to said screens when said article retaining means are aligned with said screens,
 (f) means for rotating said turret so that each of said article retaining means is moved to a printing position in alignment with one of said screens,
 (g) means for rotating said screen frame in pretimed relationship to the turret so that one individual printing screen is shifted past the article retaining means during the time it is held in the printing position,
 (h) and means for creating an electrostatic field between said screen and article retaining means so that ink will pass through the open portions of the screen to the article retaining means.

References Cited by the Examiner
UNITED STATES PATENTS

| | | |
|---|---|---|
| 2,162,317 | 6/1939 | Rez. |
| 2,369,073 | 2/1945 | Payne _____ 101—39 |
| 2,484,671 | 10/1949 | Bauman. |
| 2,625,833 | 1/1953 | Johnson _____ 73—436 |
| 2,795,150 | 6/1957 | Seidler _____ 74—436 |
| 2,834,453 | 5/1958 | Domensino _____ 198—211 |
| 2,855,845 | 10/1958 | Feeny _____ 101—39 |
| 2,950,842 | 8/1960 | Bjering _____ 221—251 |
| 3,017,234 | 1/1962 | Trimble et al. |
| 3,055,490 | 9/1962 | Anderson _____ 198—211 |
| 3,081,698 | 3/1963 | Childress et al. |
| 3,089,614 | 5/1963 | Wise et al. _____ 221—251 |
| 3,218,967 | 11/1965 | Childress. |
| 3,218,968 | 11/1965 | Childress et al. |
| 3,228,326 | 1/1966 | Childress. |

ROBERT E. PULFREY, *Primary Examiner.*

E. S. BURR, *Assistant Examiner.*

UNITED STATES PATENT OFFICE
CERTIFICATE OF CORRECTION

Patent No. 3,302,580                              February 7, 1967

James W. Edwards et al.

It is hereby certified that error appears in the above numbered patent requiring correction and that the said Letters Patent should read as corrected below.

Column 3, line 36, strike out "respectively"; column 4, line 53, for "supportnig" read -- supporting --; column 6, line 16, for "blocks 8" read -- blocks 7 --; line 64, for "radically" read -- radially --; column 7, line 44, before "screen", first occurrence, insert -- a --; line 51, for "portion" read -- portions --; column 8, line 42, after "means of" insert -- the --; column 9, line 39, for "formred" read -- formed --; column 10, line 26, for "rings 88" read -- rings 86 --; column 14, line 61, after "end of" insert -- a --; column 23, line 37, for "existing" read -- exists --; column 28, line 71, for "lob" read -- lobe --; column 30, line 39, strike out "printing"; column 32, line 68, for "approches" read -- approaches --; column 35, line 43, for "articles" read -- article --; column 38, line 73, for "sand" read -- said --.

Signed and sealed this 15th day of April 1969.

(SEAL)
Attest:

EDWARD M. FLETCHER, JR.                          EDWARD J. BRENNER
Attesting Officer                                 Commissioner of Patents